United States Patent
Winkler et al.

(10) Patent No.: US 12,538,968 B2
(45) Date of Patent: Feb. 3, 2026

(54) PORTABLE HEATING SYSTEMS

(71) Applicant: Schawbel Technologies LLC, Burlington, MA (US)

(72) Inventors: Karl Winkler, Bedford, MA (US); Mark Gibson, Bedford, MA (US)

(73) Assignee: Schawbel Technologies LLC, Burlington, MA (US)

( * ) Notice: Subject to any disclaimer, the term of this patent is extended or adjusted under 35 U.S.C. 154(b) by 0 days.

(21) Appl. No.: 18/385,024

(22) Filed: Oct. 30, 2023

(65) Prior Publication Data

US 2024/0057736 A1    Feb. 22, 2024

Related U.S. Application Data

(63) Continuation of application No. 16/748,146, filed on Jan. 21, 2020, now Pat. No. 11,800,915, which is a continuation of application No. 15/088,513, filed on Apr. 1, 2016, now Pat. No. 10,575,614.

(60) Provisional application No. 62/158,826, filed on May 8, 2015, provisional application No. 62/142,866, filed on Apr. 3, 2015.

(51) Int. Cl.
| | |
|---|---|
| *A45D 1/02* | (2006.01) |
| *A45D 1/28* | (2006.01) |
| *A45D 2/00* | (2006.01) |
| *A45D 6/20* | (2006.01) |
| *F23D 14/28* | (2006.01) |
| *F23D 14/62* | (2006.01) |
| *F23K 5/00* | (2006.01) |

(52) U.S. Cl.
CPC ............ *A45D 1/02* (2013.01); *A45D 1/28* (2013.01); *A45D 2/001* (2013.01); *A45D 6/20* (2013.01); *F23D 14/28* (2013.01); *F23D 14/62* (2013.01); *F23K 5/002* (2013.01)

(58) Field of Classification Search
CPC .......... F23D 14/28; F23D 14/62; F23K 5/002; A45D 1/02; A45D 6/20; A45D 1/28; A45D 2/001
See application file for complete search history.

(56) References Cited

U.S. PATENT DOCUMENTS

| | | | |
|---|---|---|---|
| 2,680,918 | A | 6/1954 | Behner |
| 3,360,633 | A | 12/1967 | Weisberger |

(Continued)

FOREIGN PATENT DOCUMENTS

| | | |
|---|---|---|
| CN | 2281677 | 5/1998 |
| CN | 2515992 Y | 10/2002 |

(Continued)

OTHER PUBLICATIONS

"Introducing the New Thermacell Heat Packs", <www.petersenshunting.com/shot-show-2015/introducing-new-thermacell-heat-packs/>, Published Feb. 9, 2015, Retrieved on Sep. 25, 2015.

(Continued)

*Primary Examiner* — Alfred Basichas
(74) *Attorney, Agent, or Firm* — Brown Rudnick LLP; Matthew P. York

(57) ABSTRACT

This invention relates to portable heating systems that utilize a portable fuel source. Portable heating systems of the invention generally include a regulator that is configured to vaporize fuel released from a cartridge and to transfer the vaporized fuel to a burner for ignition.

20 Claims, 21 Drawing Sheets

(56) References Cited

U.S. PATENT DOCUMENTS

| | | |
|---|---|---|
| 3,585,736 A | 6/1971 | Polichena |
| 3,621,191 A | 11/1971 | Cornwell |
| D227,924 S | 7/1973 | Goto |
| 3,800,133 A | 3/1974 | Duval |
| 4,470,263 A | 9/1984 | Lehovec et al. |
| 4,507,877 A | 4/1985 | Vaccari et al. |
| 4,665,301 A | 5/1987 | Bondy |
| 4,699,123 A | 10/1987 | Zaborowski |
| 4,716,885 A | 1/1988 | Zaborowski |
| D300,606 S | 4/1989 | Schwabel et al. |
| 4,823,482 A | 4/1989 | Lakic |
| D303,524 S | 9/1989 | Siegner et al. |
| 4,894,931 A | 1/1990 | Senee et al. |
| 4,903,416 A | 2/1990 | Levin et al. |
| 4,910,881 A | 3/1990 | Baggio et al. |
| 5,041,717 A | 8/1991 | Shay, III et al. |
| D320,212 S | 9/1991 | Someya |
| 5,230,170 A | 7/1993 | Dahle |
| D351,337 S | 10/1994 | Bonnema et al. |
| 5,483,759 A | 1/1996 | Silverman |
| 5,495,682 A | 3/1996 | Chen |
| 5,522,722 A * | 6/1996 | Diederich ............... F23D 14/04 431/89 |
| 5,565,124 A | 10/1996 | Balzano |
| 5,592,759 A | 1/1997 | Cox |
| 5,623,772 A | 4/1997 | Sunderland et al. |
| D389,953 S | 1/1998 | Seifert |
| D391,019 S | 2/1998 | Seifert |
| 5,800,490 A | 9/1998 | Patz et al. |
| 5,802,865 A | 9/1998 | Strauss |
| 5,830,208 A | 11/1998 | Muller |
| 5,857,262 A | 1/1999 | Bonnema et al. |
| 5,875,571 A | 3/1999 | Huang |
| 5,882,106 A | 3/1999 | Galli |
| 5,937,139 A | 8/1999 | Peterson |
| 5,944,508 A * | 8/1999 | Bonnema ............... F23D 14/28 126/408 |
| 5,956,866 A | 9/1999 | Spears |
| 5,970,718 A | 10/1999 | Arnold |
| 6,033,212 A | 3/2000 | Bonnema et al. |
| 6,074,414 A | 6/2000 | Haas et al. |
| 6,094,844 A | 8/2000 | Potts |
| D432,493 S | 10/2000 | Killebrew et al. |
| 6,125,636 A | 10/2000 | Taylor et al. |
| 6,176,596 B1 | 1/2001 | Shukla et al. |
| 6,189,327 B1 | 2/2001 | Strauss et al. |
| D440,201 S | 4/2001 | Huynh et al. |
| 6,235,983 B1 | 5/2001 | Becker et al. |
| 6,320,161 B1 | 11/2001 | Hansen, Jr. |
| 6,461,148 B1 | 10/2002 | Scotto et al. |
| 6,523,836 B1 | 2/2003 | Chang et al. |
| 6,649,873 B1 | 11/2003 | Cintron, Jr. et al. |
| 6,657,164 B1 | 12/2003 | Koch |
| D486,789 S | 2/2004 | Santiago |
| 6,701,639 B2 | 3/2004 | Treptow et al. |
| 6,733,282 B2 | 5/2004 | Long |
| 6,770,848 B2 | 8/2004 | Haas et al. |
| 6,840,955 B2 | 1/2005 | Ein |
| 6,841,757 B2 | 1/2005 | Marega et al. |
| 6,865,825 B2 | 3/2005 | Bailey, Sr. et al. |
| 7,022,093 B2 | 4/2006 | Smith et al. |
| D528,075 S | 9/2006 | Sugeno et al. |
| D533,832 S | 12/2006 | Hock |
| D534,307 S | 12/2006 | Vu |
| D534,308 S | 12/2006 | Vu |
| 7,152,345 B2 | 12/2006 | Koenig |
| D538,225 S | 3/2007 | Lyman et al. |
| D538,226 S | 3/2007 | Lyman et al. |
| D546,277 S | 7/2007 | Andre et al. |
| 7,244,253 B2 | 7/2007 | Neev |
| D552,081 S | 10/2007 | Yano |
| 7,497,037 B2 | 3/2009 | Vick et al. |
| 7,565,754 B1 | 7/2009 | Acheson et al. |
| D598,163 S | 8/2009 | Overend et al. |
| D598,164 S | 8/2009 | Overend et al. |
| D602,432 S | 10/2009 | Moussa |
| D609,180 S | 2/2010 | Suzuki et al. |
| 7,714,709 B1 | 5/2010 | Daniel |
| 7,716,856 B2 | 5/2010 | Seipel |
| 7,726,046 B2 | 6/2010 | Portnell |
| 7,823,302 B2 | 11/2010 | Mann et al. |
| 7,879,501 B2 | 2/2011 | Schaevitz et al. |
| D637,552 S | 5/2011 | Inman et al. |
| 7,985,502 B2 | 7/2011 | Abe et al. |
| D642,517 S | 8/2011 | Inman et al. |
| D651,343 S | 12/2011 | Robson |
| 8,074,373 B2 | 12/2011 | Macher et al. |
| 8,084,722 B2 | 12/2011 | Haas et al. |
| D654,429 S | 2/2012 | Li et al. |
| D658,330 S | 4/2012 | Yue |
| D660,149 S | 5/2012 | Grace |
| D660,798 S | 5/2012 | Tseng |
| 8,273,485 B2 | 9/2012 | Schaevitz et al. |
| D672,500 S | 12/2012 | Kim |
| D672,501 S | 12/2012 | Kim |
| D674,269 S | 1/2013 | Siepel |
| 8,384,551 B2 | 2/2013 | Ross et al. |
| 8,389,909 B2 | 3/2013 | Wang et al. |
| 8,397,518 B1 | 3/2013 | Vistakula |
| D682,195 S | 5/2013 | Aglassinger |
| D685,729 S | 7/2013 | Lyman |
| D686,157 S | 7/2013 | Kawase et al. |
| 8,510,969 B2 | 8/2013 | Luo |
| D689,019 S | 9/2013 | Sato et al. |
| D694,176 S | 11/2013 | Buetow et al. |
| D695,600 S | 12/2013 | Fujioka |
| D698,313 S | 1/2014 | Buetow et al. |
| D698,489 S | 1/2014 | Byun |
| 8,638,958 B2 | 1/2014 | Wells |
| D699,178 S | 2/2014 | Ashida et al. |
| D699,179 S | 2/2014 | Alexander |
| D700,135 S | 2/2014 | Sato et al. |
| 8,658,943 B1 | 2/2014 | Larsen et al. |
| 8,715,329 B2 | 5/2014 | Robinson et al. |
| 8,777,441 B2 | 7/2014 | Vazquez |
| 8,850,716 B2 | 10/2014 | Whitehead et al. |
| 8,869,428 B1 | 10/2014 | Zsolcsak et al. |
| 8,869,429 B1 | 10/2014 | Zsolcsak et al. |
| D722,721 S | 2/2015 | Ross |
| 9,101,177 B2 | 8/2015 | Whitehead et al. |
| D739,599 S | 9/2015 | Liu |
| D752,281 S | 3/2016 | Alima |
| D765,910 S | 9/2016 | Bermudez et al. |
| D766,503 S | 9/2016 | Liu |
| D767,200 S | 9/2016 | Liu |
| D769,518 S | 10/2016 | Liu |
| 2003/0114902 A1 | 6/2003 | Prescott |
| 2003/0145494 A1 | 8/2003 | Hsu |
| 2004/0210214 A1 | 10/2004 | Knowlton |
| 2004/0211189 A1 | 10/2004 | Arnold |
| 2004/0244810 A1 | 12/2004 | Henninger et al. |
| 2005/0028401 A1 | 2/2005 | Johnson |
| 2005/0126049 A1 | 6/2005 | Koenig |
| 2005/0193742 A1 | 9/2005 | Arnold |
| 2006/0174521 A1 | 8/2006 | Lee |
| 2006/0230641 A1 | 10/2006 | Vick et al. |
| 2006/0283050 A1 | 12/2006 | Carnes et al. |
| 2007/0039201 A1 | 2/2007 | Axinte |
| 2008/0016715 A1 | 1/2008 | Vickroy |
| 2008/0069524 A1 | 3/2008 | Yamauchi et al. |
| 2008/0077211 A1 | 3/2008 | Levinson et al. |
| 2008/0083720 A1 | 4/2008 | Gentile et al. |
| 2008/0135537 A1 | 6/2008 | Suber et al. |
| 2008/0197126 A1 | 8/2008 | Bourke et al. |
| 2008/0237113 A1 | 10/2008 | Jensen |
| 2009/0013554 A1 | 1/2009 | Macher et al. |
| 2010/0108051 A1* | 5/2010 | Walsh ............... F24C 3/12 126/39 E |
| 2010/0192406 A1 | 8/2010 | Au |
| 2010/0198322 A1 | 8/2010 | Joseph et al. |
| 2011/0083339 A1 | 4/2011 | Luo |
| 2011/0107771 A1 | 5/2011 | Crist et al. |
| 2011/0259356 A1 | 10/2011 | Barton et al. |
| 2011/0296714 A1 | 12/2011 | Holzer |

(56) References Cited

U.S. PATENT DOCUMENTS

| | | |
|---|---|---|
| 2011/0306299 A1 | 12/2011 | Wells |
| 2012/0005919 A1 | 1/2012 | Chen |
| 2012/0187066 A1 | 7/2012 | Redl |
| 2012/0240955 A1 | 9/2012 | Kennedy et al. |
| 2013/0019503 A1 | 1/2013 | Vogt |
| 2013/0085421 A1 | 4/2013 | Gillespie et al. |
| 2013/0116759 A1 | 5/2013 | Levinson et al. |
| 2013/0139605 A1 | 6/2013 | Burke et al. |
| 2013/0174451 A1 | 7/2013 | Kremer et al. |
| 2013/0181662 A1 | 7/2013 | Shapiro |
| 2013/0213147 A1 | 8/2013 | Rice et al. |
| 2013/0244074 A1 | 9/2013 | Kremer et al. |
| 2014/0059894 A1 | 3/2014 | Lupinek et al. |
| 2014/0076349 A1 | 3/2014 | Deng |
| 2014/0182162 A1 | 7/2014 | Hakkala |
| 2014/0182163 A1 | 7/2014 | Krupenkin et al. |
| 2014/0222173 A1 | 8/2014 | Giedwoyn et al. |
| 2014/0277632 A1 | 9/2014 | Walker |
| 2015/0059784 A1 | 3/2015 | Liu |
| 2015/0269889 A1 | 9/2015 | Hsu et al. |
| 2015/0335121 A1 | 11/2015 | Floessholzer et al. |
| 2016/0286927 A1 | 10/2016 | Winkler et al. |

FOREIGN PATENT DOCUMENTS

| | | | |
|---|---|---|---|
| CN | 101641027 A | | 2/2010 |
| CN | 201976877 U | | 9/2011 |
| DE | 20317143 U1 | | 4/2004 |
| DE | 10352050 A1 | | 12/2004 |
| DE | 102008029727 A1 | | 12/2009 |
| EP | 0251084 A2 | | 1/1988 |
| EP | 0569047 A2 | | 11/1993 |
| EP | 0854696 B1 | | 7/1998 |
| EP | 0986719 A2 | | 3/2000 |
| EP | 1820247 A2 | | 8/2007 |
| EP | 1880137 A1 | | 1/2008 |
| EP | 2215918 A2 | | 8/2010 |
| KR | 20-0273770 | | 4/2002 |
| KR | 100539710 B1 | | 12/2005 |
| KR | 2009-0117205 A | | 11/2009 |
| WO | 87/01916 A2 | | 4/1987 |
| WO | 2006054080 A2 | | 5/2006 |
| WO | 2006/111823 A1 | | 10/2006 |
| WO | 2006/114690 A1 | | 11/2006 |
| WO | 2008/006731 A1 | | 1/2008 |
| WO | 2008/069254 A1 | | 6/2008 |
| WO | 2008/069524 A1 | | 6/2008 |
| WO | 2011057142 A2 | | 5/2011 |
| WO | 2013/101920 A1 | | 7/2013 |
| WO | 2014064518 A2 | | 5/2014 |

OTHER PUBLICATIONS

"New for 2015—ThermaCELL Heat Packs for Rechargeable Warmth Wherever You Need It", <http://www.ammoland.com/2015/03/new-for-2015-thermacell-heat-packs-for-rechargeable-warmth-wherever-needed/#axzz3gRpAQHtU>, Published Mar. 12, 2015, Retrieved on Sep. 25, 2015.

"ThermaCELL Announces new Rechargeable Heat Packs" <http://www.americanhunter.org/articles/2015/4/22/thermacell-announces-new-rechargeable-heat-packs/>, Published Apr. 22, 2015, Retrieved on Sep. 25, 2015.

"ThermaCELL Heat Packs for Rechargeable Warmth Wherever Needed", <http://huntinglife.com/thermacell-heat-packs-for-rechargeable-warmth-wherever-needed/>, Published Mar. 16, 2015, Retrieved on Sep. 25, 2015.

"Thermacell HeatPacks—New Rechargeable Warmers" <www.bowhunting.com/news/2015/03/12/thermacell-heatpacks-new-rechargeable-warmers/>, Published Mar. 12, 2015, Retrieved on Sep. 25, 2015.

"Thermacell HeatPacks—New Rechargeable Warmers", <http://www.huntingnetwork.com/publisher/Hunting-News/2015/3/12/Thermacell-HeatPacks--New-Rechargeable-Warmers>, Published Mar. 12, 2015, Retrieved on Sep. 25, 2015.

Conair You Curl Curling Wand, www.Amazon.com, 7 pages, reviewed more than 1 year prior to parent filing date, downloaded Jun. 13, 2016.

Kenisarin, 2007, Solar energy storage using phase change materials, Renewable and Sustainable Energy Reviews, 11(9): 1913-1965.

Sharma, 2009, Review on thermal energy storage with phase change materials and applications, Renewable and Sustainable Energy Reviews, 13(2):318-345.

ThermaCell by Conair Compact Curling Iron, www.Amazon.com, 7 pages, reviewed more than 1 year prior to parent filing date, downloaded Jun. 13, 2016.

* cited by examiner

OFF - switch OFF

ON - switch ON

OFF - switch ON

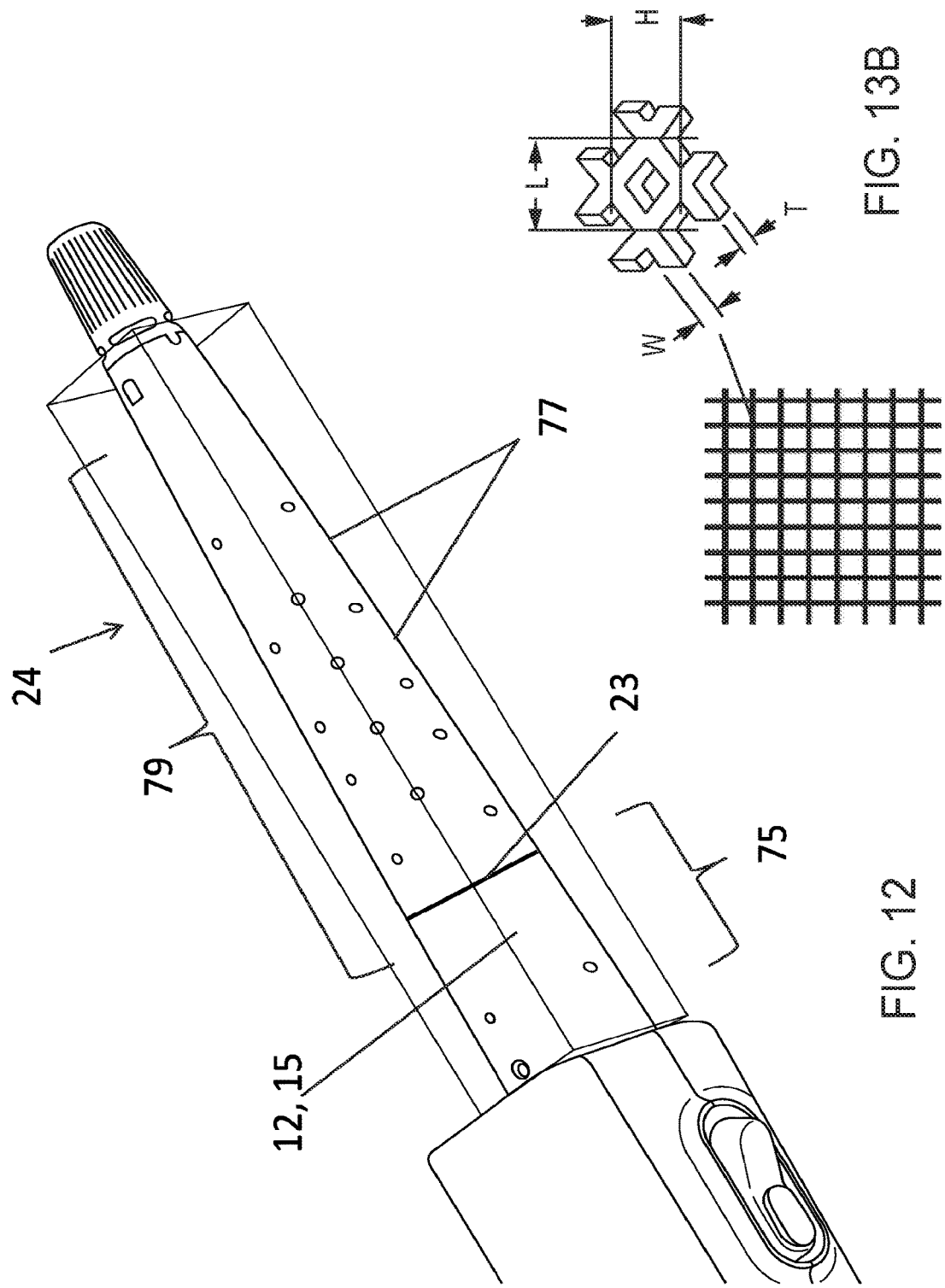

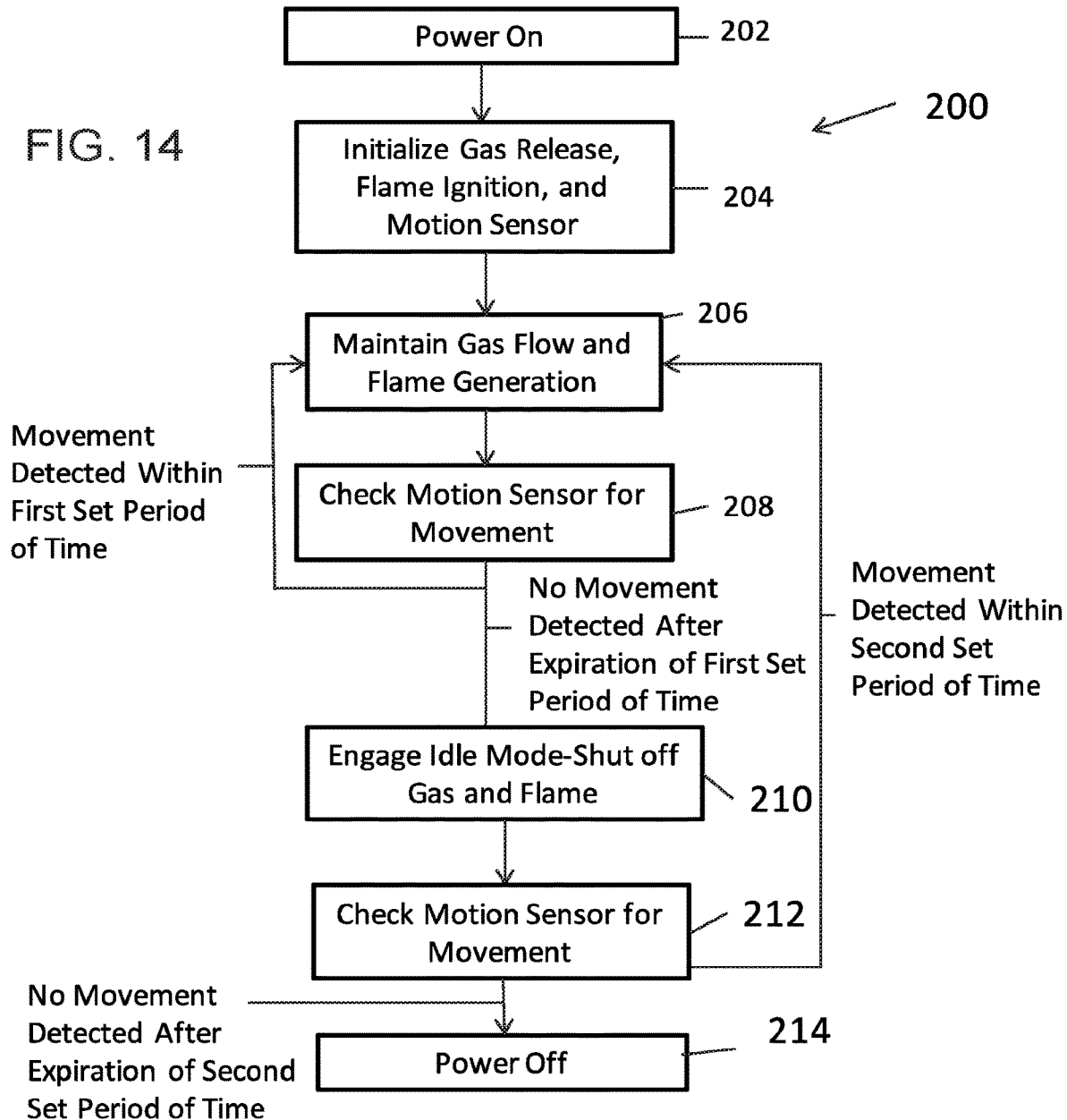

PORTABLE HEATING SYSTEMS

RELATED APPLICATIONS

This application is a continuation of U.S. application Ser. No. 16/748,146, filed Jan. 21, 2020, which is a continuation of U.S. application Ser. No. 15/088,513, filed Apr. 1, 2016 (now issued as U.S. Pat. No. 10,575,614), which claims the benefit of and priority to U.S. Provisional Application Nos. 62/142,866, filed Apr. 3, 2015, and 62/158,826, filed May 8, 2015, the content of each of which is incorporated by reference herein in their entireties.

TECHNICAL FIELD

This invention relates to portable heating systems.

BACKGROUND

Portable heating systems are desirable because they allow individuals to freely use appliances that are traditionally limited to use within the confines of a plug-in electrical source. Portable heating devices may include, for example, hair appliances (curling iron, hair dryer, etc.), clothing iron or steamer, heat massagers, body warmers, travel stove or hot plate, hot glue guns, food or beverage warmers, lanterns, etc. Generally, any energy-powered device that requires or would benefit from portability can be transitioned into a portable heating device using a portable energy source.

Portable energy sources include electrical and fuel energy sources. Portable electrical energy sources are typically battery-powered. While batteries are sufficient for certain devices, often batteries are not able to provide enough energy for maintaining the high temperatures necessitated by portable heating devices.

SUMMARY

Fuel energy sources can be used to create portable heating devices. Fuel energy sources typically take the form of replaceable or rechargeable cartridges that are filled with a fuel (such as butane, propane, or a combination thereof) in the liquid state. The cartridges can include or can plug into a vaporizer that transitions the liquid fuel into gas and transfers the gas to a heating assembly for ignition.

This invention relates to portable heating systems that utilize a portable fuel source. A portable heating system of the invention can be, for example, a hair straightener or a hair curling iron. Portable heating systems of the invention generally include a regulator that is configured to vaporize fuel released from a cartridge and to transfer the vaporized fuel to a burner for ignition. The ignited fuel transfers heat to an element (e.g. barrel of a curling iron or an iron panel of a hair straightener). The cartridge can contain one or more fuel sources in a liquid state and can include a valve that releases the fuel from the cartridge. The regulator is configured to receive the liquid fuel directly from the cartridge and into a fuel cavity of the regulator. The regulator vaporizes the liquid fuel and then transfers the gas to a burner for ignition. When entering the fuel cavity, the liquid fuel is vaporized due, at least in part, to exposure to the temperature of the regulator and contact with an inner surface of the regulator. The conditions within the fuel cavity allow the liquid fuel to be completely vaporized within the regulator and only gas is emitted from an exit port of the regulator.

Due to the vaporization conditions of the regulator, a separate vaporizer within the cartridge or coupled to the regulator is not required to vaporize the cartridge's fuel into a gas. Separate vaporizers include, for example, distal vaporizers that receive liquid from the regulator to initiate vaporization or proximal vaporizers within the cartridge that pre-vaporize fuel in the cartridge prior to its emission. Instead of relying on a separate vaporizer, the regulator of the present invention is able to receive and instantaneously vaporize higher, quantifiable volumes of liquid fuel directly from the cartridge and emit only vaporized fuel from the regulator. In doing so, a higher quantity of gas can be immediately transferred and consistently transferred over time from the regulator to the burner than possible when using a separate vaporizer. The immediate and consistent transfer of gas to the burner for ignition allows the heated element to quickly achieve and maintain its desired temperature. Portable heating systems of the invention are able to elevate the temperature of a heated element up to 400° F. or more, and provide such heat within, for example, 90 seconds or less.

According to certain aspects, portable heating systems of the invention include a regulator. The regulator comprises a conductive material and defines a pressurized fuel cavity. The regulator, when at a temperature above about 38° F., is configured to vaporize a liquid mixture of propane and butane received within the pressurized fuel cavity and to emit only vaporized gas from the regulator. The liquid fuel mixture may include at least about 70% butane. In certain embodiments, the liquid fuel mixture includes about 80% butane and about 20% propane. The regulator may include an inlet port that receives the liquid fuel mixture therethrough. The liquid fuel mixture may be stored within a fuel cartridge that is in fluid communication with the regulator. The regulator may also include an outlet port through which the gas is transferred to a burner for ignition.

The portable heating system may also include a heated element and a fuel cartridge, which are operably coupled to the regulator. The fuel cartridge is operably coupled (directly or indirectly) to a proximal end of the regulator. The fuel cartridge contains the liquid mixture, and is configured to release the liquid fuel mixture into the regulator. In certain embodiments, the fuel cartridge forms, at least in part, a handle of the portable heating system. The heated element is operably coupled (directly or indirectly) to a distal end of the regulator. The heated element is heated by the ignited gas that was emitted from the regulator. In certain embodiments, the heated element is a barrel for a hair curling iron or an iron panel for a hair straightener.

In further aspects, a portable heating system of the invention includes a regulator and a diaphragm. The regulator has a first temperature and includes an inlet port, an outlet port, and an inner surface that defines a fuel cavity. The diaphragm forms a side of the fuel cavity and is configured to pressurize the fuel cavity. When a liquid mixture of propane and butane is received within the fuel cavity through the inlet port, it is exposed to the first temperature and contacts the inner surface of the regulator. This causes the liquid fuel mixture to vaporize and provides that only vaporized fuel is emitted from the outlet port of the regulator.

As discussed, portable heating systems of the invention may further include an adaptor that couples the fuel cartridge to the regulator or to a heating assembly that includes the regulator. Particularly, the adaptor acts an intermediate member that couples to a distal portion of the cartridge and a proximal portion of the regulator or heating assembly. In a preferred coupling, the distal end of the cartridge includes a post, and the adaptor defines an interior configured to receive the distal portion of the cartridge. The adaptor also includes a ledge that forms a ramp and an indent. When the distal portion of the cartridge is inserted into and rotated within the interior of the adaptor, the post of the distal portion moves along the ramp and mates with the indent, thereby coupling the cartridge and the adaptor. In certain embodiments, the adaptor also includes an inlet to receive the post of the cartridge during its insertion.

Portable heating systems of the invention may also include a circuit that controls one or more functions of the system. In certain embodiments, the circuit controls and monitors the release of fluid gas and the ignition of vaporized gas. The circuit generally includes a processor configured to execute instructions and may also include one or more sensors. The one or more sensors may be a temperature sensor, a motion sensor, or both. The motion sensor is preferably a accelerometer.

According to certain aspects, portable heating systems of the invention include a fuel cartridge, a heating assembly, and a circuit. The fuel cartridge includes liquid fuel. The heating assembly is operably coupled to the fuel cartridge and configured to release the liquid fuel from the fuel cartridge. The circuit is operably associated with the heating assembly and includes a processor and a motion senor. The processor of the circuit is configured to activate the heating assembly to release the liquid fuel in response to a first user command, monitor the motion sensor for movement of the portable heating system, de-activate the heating assembly to stop release of liquid fuel if movement of the portable heating system is not detected during a first period of time, and re-activate the heating assembly to re-release liquid fuel if movement of the portable heating system is detected during a second period of time. The first period of time may range from about 2 minutes to about 10 minutes. The second period of time may range from about 2 minutes to about 15 minutes. The first user command may include turning the portable heating system on. If no movement of the portable heating system is detected during the second period of time, a second user command is required to re-activate the heating assembly. The second user command may include turning the portable heating system off then on. The circuit may be operably associated with a motor of the heating assembly. To release the fuel, the circuit may cause the motor to engage a plunger to release liquid fuel from the cartridge.

BRIEF DESCRIPTION OF THE DRAWINGS

FIG. 12 illustrates a heated element with openings to release infrared radiation from the heating assembly.

FIGS. 13A-13B illustrate a flame arrester suitable for use with portable heating systems.

FIG. 14 provides an exemplary flow chart of a motion sensing process executed by the circuit 25 of the portable heating system.

DETAILED DESCRIPTION

Figure 1:
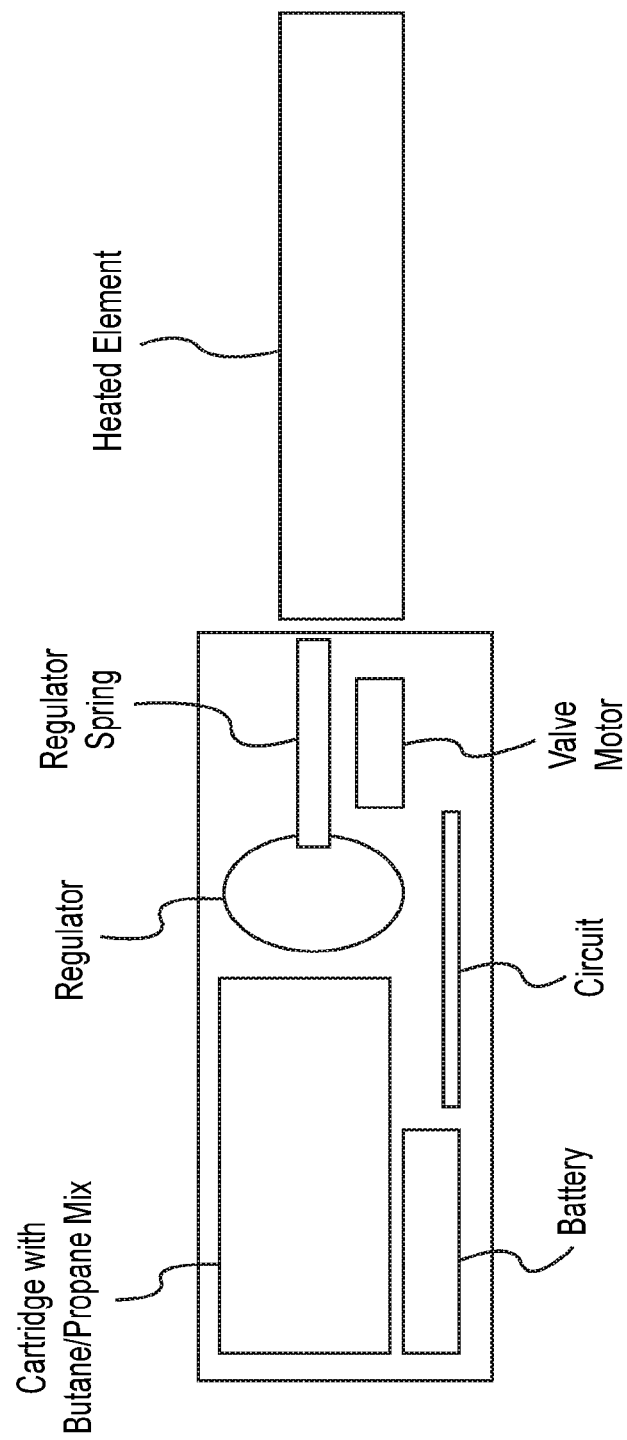
FIG. 1 is a schematic drawing a portable heating system.

This invention relates to portable heating systems that utilize a portable fuel source. Portable heating systems of the invention may include a hair straightener, hair curing iron, hair dryer, lamp, etc. Portable heating systems of the invention generally include a regulator that vaporizes liquid fuel released from a fuel cartridge and transfers/emits the vaporized fuel to a burner for ignition. The ignited fuel then transfers heat to a heated element (e.g. barrel of a curling iron of an iron panel of a straightener). The cartridge contains one or more fuel sources in their liquid state. In certain embodiments, the cartridge includes a valve that releases the fuel source into the regulator. The regulator receives and vaporizes the liquid fuel in a fuel cavity of the regulator. While in the fuel cavity, the liquid fuel is vaporized due, at least in part, to exposure to the temperature and exposure to the inner surface of the regulator's fuel cavity and the type of liquid fuel. The greater the temperature and the greater the surface area of the inner surface, the faster the liquid fuel is vaporized. The regulator is preferable formed from a conductive material, which allows the regulator to transfer heat and achieve the desired temperature for vaporization. In certain embodiments, a diaphragm forms a side of the fuel cavity and is configured to pressurize the fuel cavity. The vaporization conditions (e.g., exposure to temperature and inner surface) of the fuel cavity allow the liquid fuel to be completely vaporized within the regulator and only gas is emitted from the regulator. The vaporized gas may then be transferred to a burner to ignite the gas, and provide heat to the heated element associated with the regulator.

Due to the conditions of the regulator, a separate vaporizer within the cartridge or coupled to the regulator is not required to vaporize the gas. Separate vaporizers include, for example, distal vaporizers that receive liquid from the regulator to initiate vaporization or proximal vaporizers within the cartridge that pre-vaporizes fuel emitted from the cartridge prior to its introduction into the regulator. Instead of relying on a separate vaporizer, the regulator of the present invention is able to receive and instantaneously vaporize higher, quantifiable volumes of liquid fuel directly from the cartridge and emit only vaporized fuel from the regulator. In doing so, a higher quantity of gas can be immediately and consistently transferred over time from the regulator to the burner than possible when using a separate vaporizer. The immediate and consistent transfer of gas to the burner for ignition allows the heated element to quickly achieve and maintain its desired temperature. Portable heating systems of the invention are able to elevate the temperature of a heated element up to 400° F. or more, and provide such heat within, for example, 90 seconds or less.

Temperatures of the regulator suitable for vaporization within the fuel cavity are dependent on the type of fuel. For fuel mixtures of propane and butane, a temperature of at least about 38° F. is preferable. In certain embodiments, the desired temperature is at least about 40° F. In some instances, an external heater may be used to achieve the desired temperature of regulator to cause vaporization. The volume of the fuel cavity may be chosen based on the desired portability of the device and its intended use. For example, outdoor lamps may require more fuel, and thus would benefit from greater quantities of vaporized gas than that required or desired for portable hair appliances. Generally, the regulator is shaped to define a fuel cavity with the smallest volume possible for the intended use while maximizing the surface area of the inner surface of the regulator. For portable hair appliances, the fuel cavity may have a volume of about 100, 150, 200, 250, 300, 350, 400 cubic millimeters. Preferably, the fuel cavity for portable hair appliances has a volume of about 300-400 $mm^3$. In certain embodiments, the fuel cavity has a volume of 354 $mm^3$. According to certain embodiments, the shape of the fuel cavity is such that the surface area of the inner surface is maximized for the volume. By maximizing surface area, the regulator's design increases the amount fuel liquid that contacts the inner surface and is exposed to the temperature of the regulator. This causes rapid and consistent vaporization of the fuel liquid within the regulator, which can then be transferred to the burner.

Figure 11A:
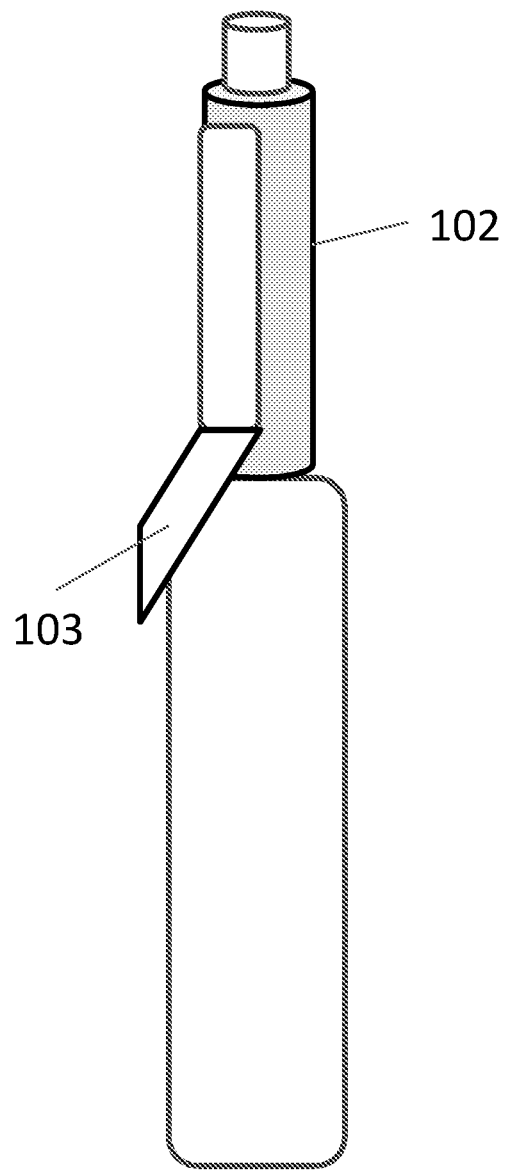
FIGS. 11A-11D illustrate various heated elements for use with portable heating systems.
Figure 11B:
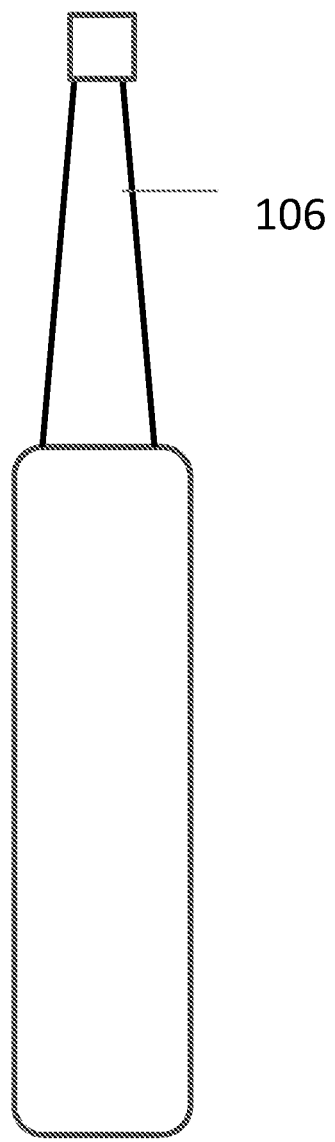
Figure 11C:
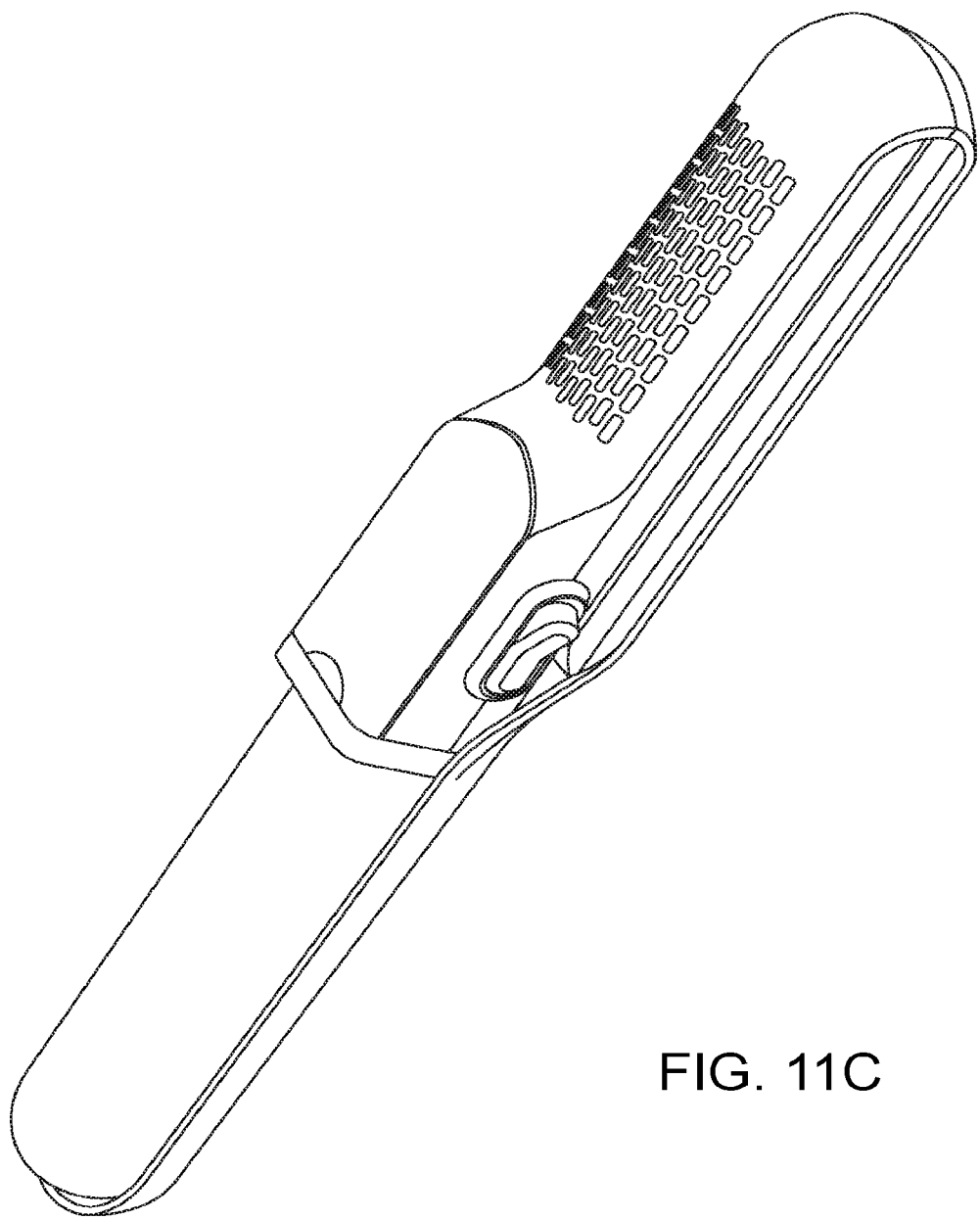
Figure 11D:
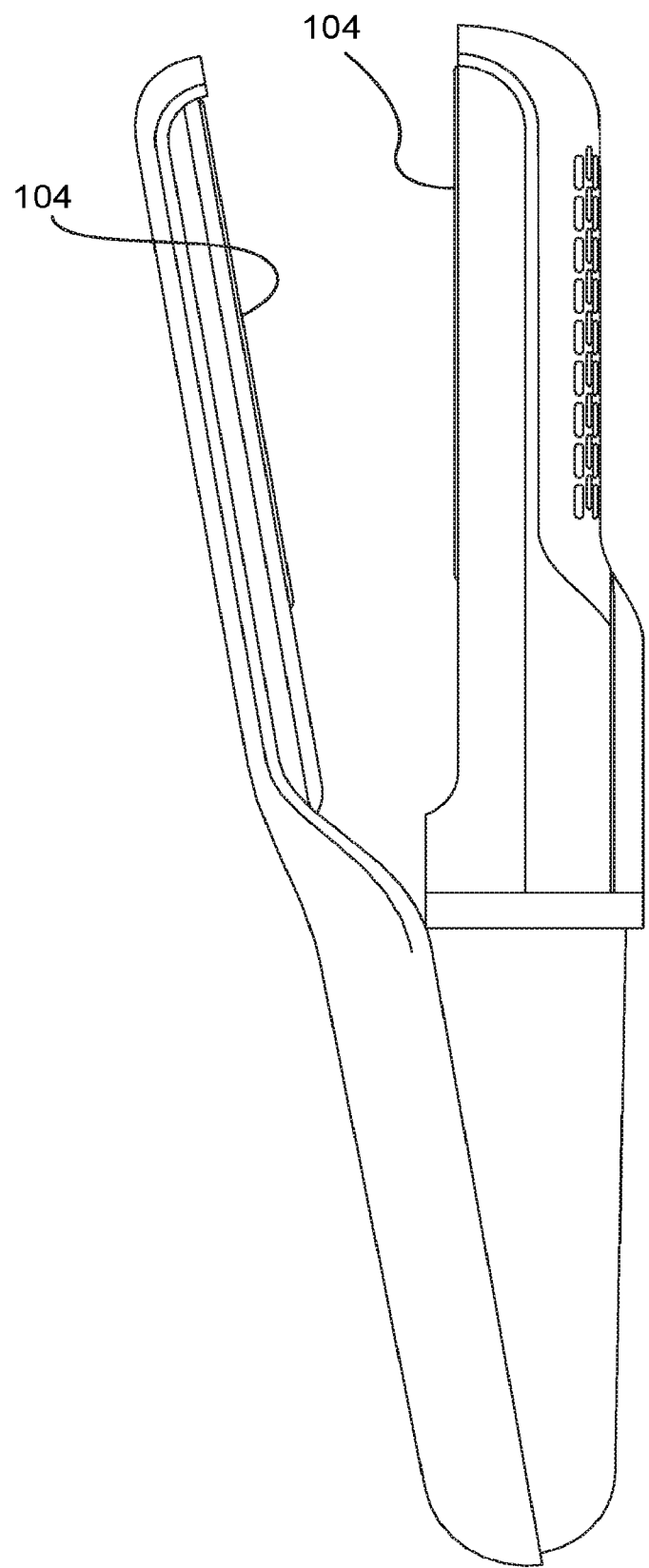

Turning now to the figures, FIG. 1 depicts a schematic diagram of a portable heating system. The portable heating system includes a cartridge with liquid mixture of butane and propane. The cartridge is operably associated with a heating assembly. The heating assembly includes a regulator. The regulator is associated with a regulator spring. The heating assembly may also include a valve motor that can be used to engage a valve to initiate fuel release from the cartridge and/or engage a valve to stop gas release from the cartridge. The battery and printed circuit board (PCB) may be operably associated with the valve motor. The circuit board may include a processor for controlling the function of the valve motor. The regulator is associated with a heat arrester that directs fuel from the regulator to a burner, where the gas is ignited and thermal energy is transferred to the heated element. The heated element is operably associated with the heating assembly. FIGS. 11A-11C illustrate the portable heating system having various heated elements. As shown in FIG. 11A, the portable heating system is curling iron and the heated element is a curling iron barrel 102 with a grasper 103. As shown in FIG. 11B, the portable heating system is a curling iron and the heated element is a curling wand 106 (i.e. curling iron barrel without grasper). As shown in FIGS. 11C-11D, the portable heating system is a hair straightener and the heated element is one or more straightener panels 104. FIG. 11C illustrates the straightener in the closed configuration, and FIG. 11D illustrates the straightener in the open configuration.

Figure 2:
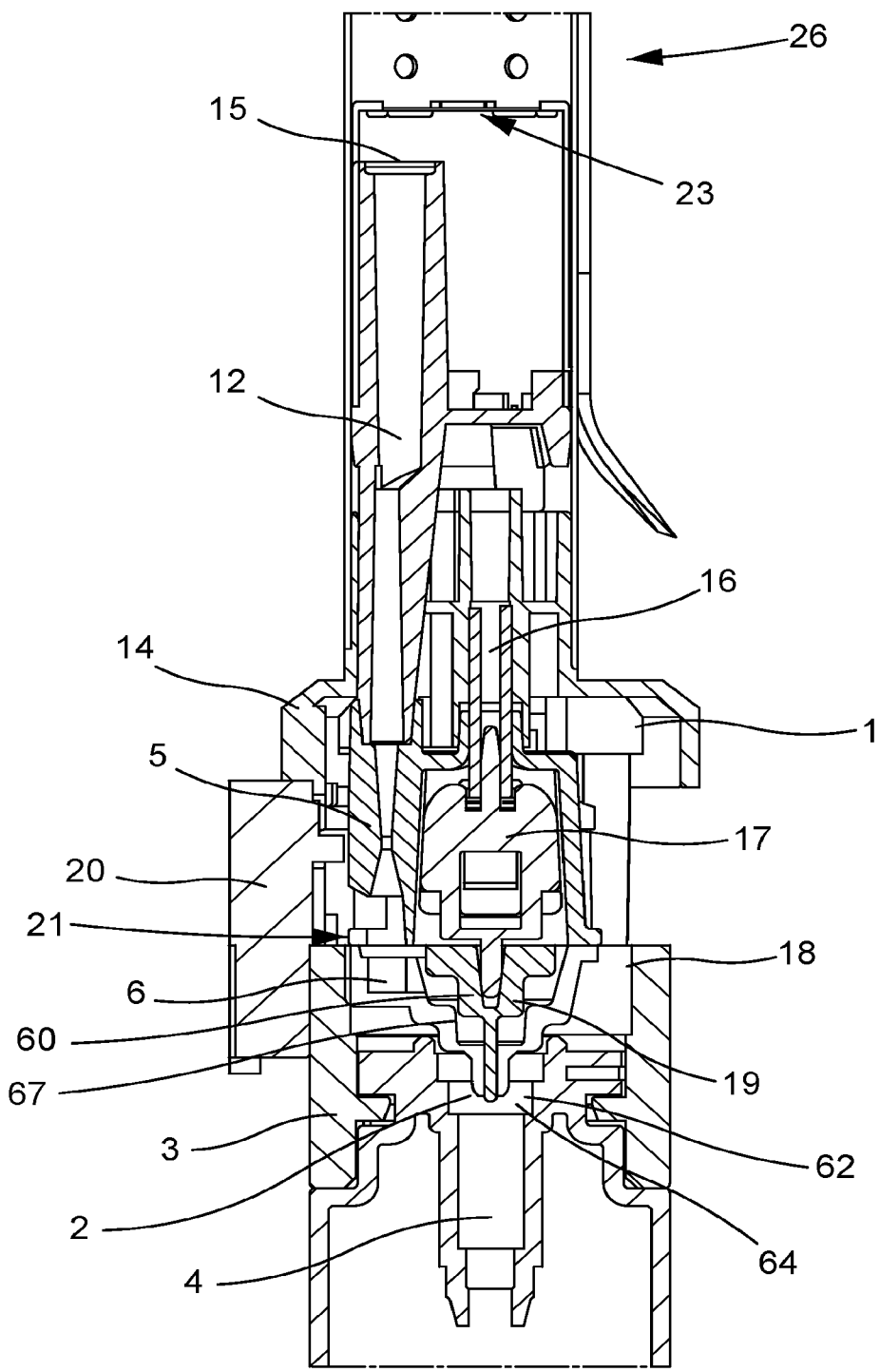
FIG. 2 is a cross-sectional view of a portable heating system.

FIG. 2 is cross-sectional view of a portable heating system, according to certain embodiments. The portable heating system includes a cartridge 4 operably coupled to a heating assembly. The cartridge 4 releasably contains liquid fuel, and the heating assembly is configured to release the fuel from the cartridge 4. In certain embodiments, a cartridge adaptor 3 is used to couple the cartridge 4 to the heated assembly, heated element or both. Cartridge adaptors may be designed such that its proximal end is compatible with distal portions of certain fuel cartridges, and that the cartridge's distal end is compatible with certain heating assemblies or heated elements. With use of cartridge adaptors, the heating assembly, the heated element or the cartridge are able to couple without having to be directly compatible with each other. The cartridge adaptor 3 may couple to the cartridge 4 or the heating assembly in any suitable fashion. A preferred coupling between the cartridge adaptor 3 and the cartridge 4 is shown and discussed with reference to FIGS. 7-10B.

The heating assembly includes a regulator. The regulator may include a lower regulator 6 and, optionally, an upper regulator 5. The lower regulator 6 is configured to immediately vaporize liquid fuel released from the cartridge and emit the vaporized fuel. As shown in FIG. 2, the lower regulator 6 of the heating assembly is engaged with a distal portion of the cartridge 4. The distal portion of the cartridge 4 includes an outlet port 64 in communication with an inlet port 62 of the lower regulator 6. The lower regulator 6 includes an inner surface 67 that defines a fuel cavity 60 of a certain volume. The fuel cavity 60 receives liquid fuel that is released from the fuel cartridge 4 and passes through the inlet port 62.

Fuel vaporized within the fuel cavity 60 is emitted as gas through the outlet port 64. The emitted gas travels through the rest of the heating assembly, where it is eventually ignited. In certain embodiments, a top side of the fuel cavity 60 of the lower regulator 6 is enclosed by a diaphragm 18, leaving the inlet port 62 and the outlet port 21 as the points of entry or exit of the fuel cavity. In this manner, the diaphragm 18 creates a pressurized environment within the fuel cavity 60.

According to aspects of the invention, the lower regulator 6 and its fuel cavity 60 are designed to completely vaporize gas received through the inlet port and only emit vaporized gas through the outlet port. This complete vaporization of liquid fuel ensures that only gas is emitted from the lower regulator 6 and transferred throughout other components of the heating assembly. Conditions for promoting vaporization within the lower regulator 6 include: the temperature of the lower regulator 6 and the surface area of the lower regulator 6. In certain embodiments, the temperature of the lower regulator 6 and surface area of the inner surface 67 are selected such that liquid fuel entering the fuel cavity 60 through the inlet port 62 is able to completely vaporize prior to being emitted from the outlet port 21 of the lower regulator 6.

Generally, the lower regulator 6 is shaped to define a fuel cavity 60 with a small volume as possible for the intended use while maximizing the surface area of the inner surface 67 of the regulator 6. According to certain embodiments, the shape of the fuel cavity 60 is such that the surface area of the inner surface 67, which defines the fuel cavity 60, is maximized for the volume. For portable hair appliances, the fuel cavity 60 may have a volume of about 100, 150, 200, 250, 300, 350, 400 cubic millimeters. Preferably, the fuel cavity 60 for portable hair appliances has a volume of about 300-400 $mm^3$. In certain embodiments, the fuel cavity 60 has a volume of 354 $mm^3$. A volume of about 300-400 $mm^3$ is able to vaporize liquid fuel (80% butane and 20% propane) introduced into the lower regulator 6 (having a temperature of greater than 38° F.) at about 3.4 grams/hour.

In addition to the lower regulator 6, the heating assembly includes one or more of the following components: upper regulator 5, valve motor 20, lower plunger 19, upper plunger 17, stack screw 1, regulator spring 16, holder 14, heat arrester 12, burner 15, and flame arrester 23. In certain embodiments, the lower regulator 6 and one or more other components of the heating assembly are formed from, at least partially, a thermally-conductive material (such as a metal). In some embodiments, the lower regulator 6, upper regulator 5, and heat arrester 12 are formed from a thermally-conductive material.

Figure 4:
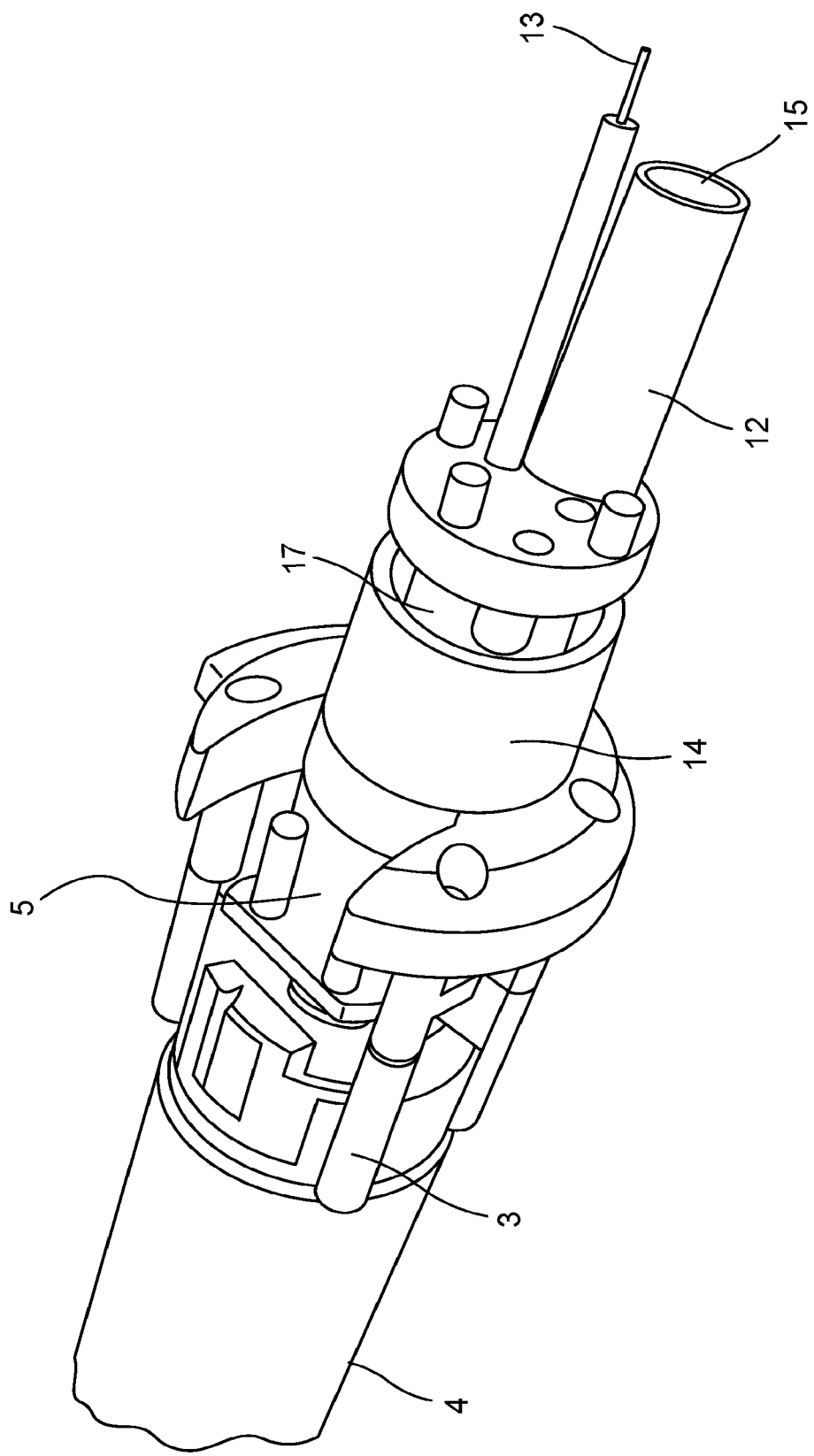
FIG. 4 depicts the assembled components of the heating assembly as coupled to the adaptor and cartridge.

The lower regulator 6 and other internal components of the heating assembly are operably associated with an element or device to be heated (i.e. heated element 26). The heated element 26 may include or be coupled to a holder 14, and the holder 14 may house, at least partially, one or more components of the heating assembly. In addition, the holder 14 may be used to couple the heated element 26 to the cartridge 4 or the cartridge adaptor 3. As shown in FIG. 2, the holder 14 includes a stack screw 1 that couples the holder 14 to the adaptor 3. The coupling of the heating assembly, cartridge 4, cartridge adaptor 3, and holder 14 is best shown in FIG. 4. As shown in FIG. 4, a proximal end of the holder 14 is coupled to a distal end of the adaptor 3, and a proximal end of the adaptor is coupled to a distal end of the cartridge 4. At least a portion of the heated assembly is contained within or surrounded by the barrel holder 14 and the adaptor 3. As shown in FIG. 4, the heat arrestor 12 and the electrode 13 extended distally beyond the holder 14. These components may be inserted into and surrounded by a proximal portion of a heated element 26.

The following provides how the heating assembly releases, vaporizes, and ignites fuel emitted from the cartridge 4 in order to provide heat to the heated element 26.

To release fuel from the cartridge 4, an internal mechanism engages a valve 2 of the outlet port 64 of the cartridge 4. According to certain embodiments, the internal mechanism includes the regulator spring 16, the upper plunger 17, a lower plunger 19, diaphragm 18, and a switch arm 7. The regulator spring 16 biases the upper plunger 17 against the switch arm 7, and the switch arm 7 is associated with a user-operated on/off switch 8. When the switch 8 is turned from the off position to the on position, the switch arm causes proximal movement of the upper plunger 17, which in turn causes proximal movement of the lower plunger 19. This is described in more detail with reference to FIGS. 6A-6C. The proximal movement of the lower plunger 19 causes the lower plunger 19 to engage with the valve 2 of the cartridge 4. When the valve 2 is engaged, liquid fluid is released from the outlet port 64 of the cartridge 6, through the inlet port 62 of the lower regulator 6 and into the fuel cavity 60. When the liquid fuel is released into the fuel cavity 60 of the lower regulator 6, the liquid fuel is exposed to the inner surface 67 of the fuel cavity 60 of the lower regulator 6. The temperature of the lower regulator 6 and exposure to the inner surface 67 vaporizes the fuel. The greater the surface area of the inner surface 67 of the fuel cavity 60, higher volumes of liquid are heated by the lower regulator 6 and quickly vaporized. In certain embodiments, diaphragm 18 is also engaged by the translation of the upper and lower plungers 17, 19. When engaged, the diaphragm 18 forms the upper side of the fuel cavity 60 of the lower regulator 6, and generates pressure within the fuel cavity 62. The diaphragm 18 effectively seals the lower regulator 6 and provides that the vaporized fuel exits the fuel cavity 60 only through the outlet port 21.

The vaporized fuel then travels through the upper regulator 5 through a heat arrester 12 to a burner 15, where the gas is ignited. The ignited gas in turn heats the heated element 26. The burner 15 may be ignited in any suitable manner. In certain embodiments, an electrode 13 (See FIG. 3) generates a spark, which ignites the gas. The electrode 13 is ideally positioned next to the burner 15 of the heat arrester 12. The electrode 13 may be energized to ignite the burner 15 when the switch 8 to the on position. In certain embodiments, a circuit 25, such as printed circuit board (PCB), is associated with the switch 8 and signals energizing the electrode via a battery 33. The circuit 25 is also configured to activate the heating assembly in response to a user pressing an on/off switch. Once ignited by the electrode 13, the gas produces a flame at the burner 15. In certain embodiments, a flame arrester 23 provides a barrier to block, at least partially, the flame. As shown in FIG. 2, the heated element 26 is the barrel of a curling iron that is used to shape/curl one's hair. The heated element 26 may be coupled to a cool cap 27. The cool cap 27 allows user to hold a distal end of the portable heating system without risk of being burned. Preferably, the cool cap 27 is formed from a non-conductive material.

Figure 3:
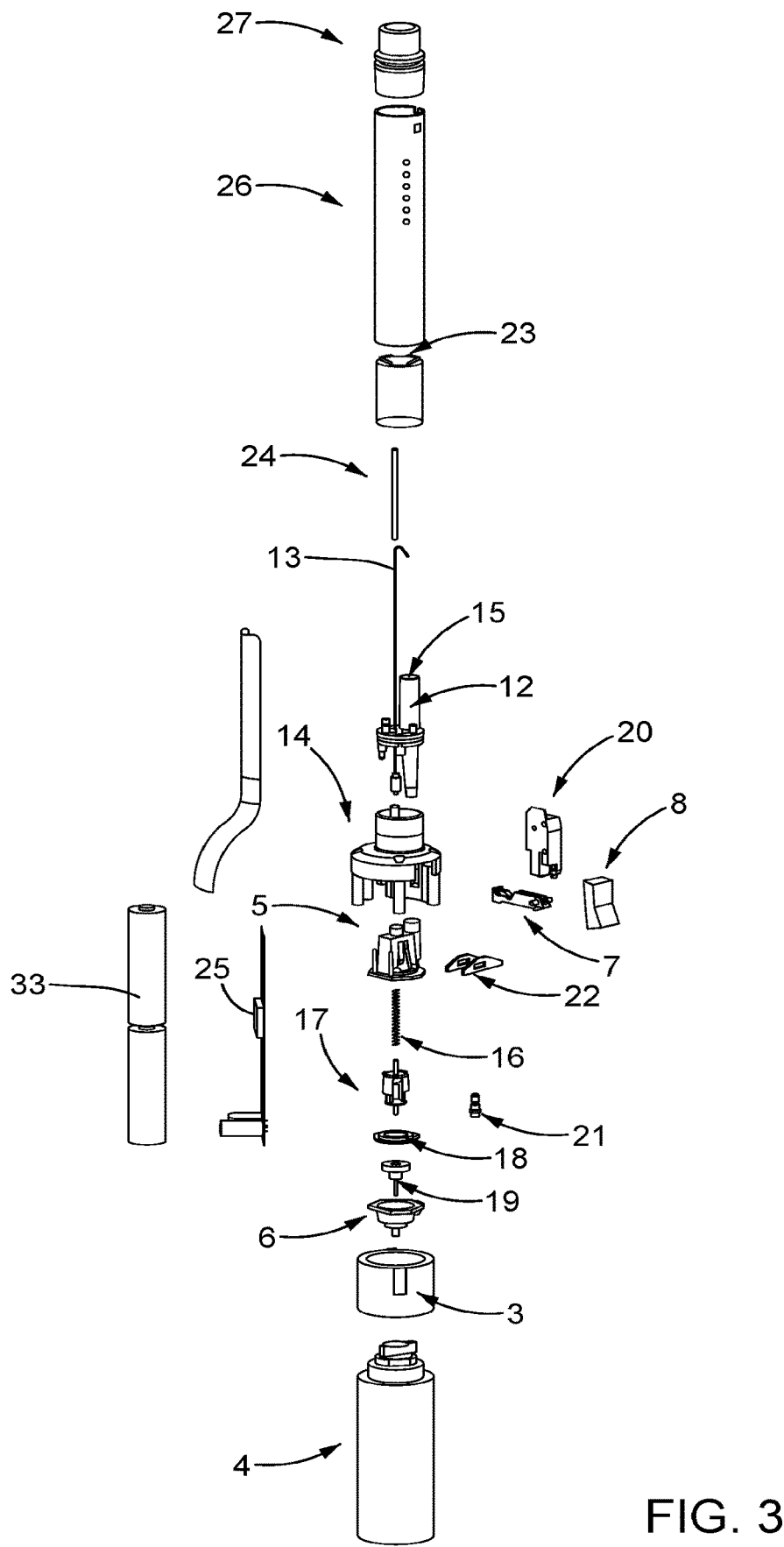
FIG. 3 is an exploded view of the components of the portable heating system of FIG. 2.

FIG. 3 illustrates an exploded view of the components of a portable heating system. A shown in FIG. 3, the components include the cartridge 4, which couples to the cartridge adaptor 3. The cartridge adaptor 3 is configured to mate with a holder 14. The lower regulator 6, lower plunger 19, diaphragm 18, stem 21, upper plunger 17, regulator spring 16, and upper regulator 5 are housed between the cartridge adaptor 3 and the barrel holder 14. The upper plunger 17 is associated with plunger actuation arm 22 and a switch arm 7. The switch arm 7 associates the upper plunger 17 with the on/off switch 8. The on/off switch 8 is in communication with a circuit 25, which is powered by batteries 33. The plunger actuation arm 22 is in communication with and engages the upper plunger 17 with the valve motor 20. A lower channel of the heat arrestor 12 is received by the holder 14 and placed in communication with the upper regulator 5. The upper channel of the heat arrestor 12 leads to the burner 15. An electrode 13 runs adjacent to the heat arrester 12. A ceramic insulator 24 may be placed around a portion of the electrode 15. A flame arrester 23 minimizes exposure of generated flames directly to the heated element 26. The flame arrester 23 may be formed as part of the heating assembly or as an internal component of the heated element 26. For example, the flame arrester 23 may be mesh built into an internal cavity of the heated element 26. In certain instances, the heated element 26 includes a non-conductive portion 27. The non-conductive portion 27 does not readily absorb the heat generated by the flames, and can provide a touchable surface for a user.

According to certain aspects of the invention, the heated element 26 is configured to emit infrared radiation in addition to thermal energy. The emission of infrared radiation from the heated element 26 is especially beneficial when the heated element 26 is a hair appliance. Infrared radiation has been attributed with sealing hair cuticles during heating to prevent damage, smooth strands, and add shine. According to certain embodiments, the heated element 26 may include one or more openings that allow infrared radiation from the ignited fuel to be emitted. FIG. 12 depicts a curling iron heated element 26 that emits infrared radiation. The curling iron heated element 26 surrounds or is coupled adjacent to the heat arrestor 12 and burner 15 of the heated assembly. Preferably, the heater arrestor 12 and burner 15 extend into a proximal portion 75 of the curling iron heated element 26 (see FIGS. 5A and 5B). When in use, the burner 15 ignites gaseous fuel from the heated assembly. The ignited fuel transfers thermal energy to the curling iron heated element 26 and also emits infrared radiation. The curling iron heated element includes an infrared zone 79 through which the infrared radiation is emitted. In certain embodiments, the infrared zone 79 includes one or more openings 77 that emit the infrared radiation. During use, the infrared radiation is directly exposed to a user's hair through the openings 77 as it is wrapped around the curling iron for styling. The openings 77 may be of any shape and arranged in any pattern. As shown, the openings 77 are circular in shape, but they may also be, for example, rectangular slots. Preferably, the openings 77 are arranged for an even distribution of emitted infrared energy from the heated element 26.

In certain embodiments, a flame arrestor 23 is positioned distal to gas ignited by the burner 15 to prevent the resulting flame from escaping the heated element 26. The flame arrestor 23 may be a mesh, such as an aluminum mesh. The flame arrestor 23 may be a component of the heating assembly or of the heated element. The mesh of the flame arrestor 23 is ideally chosen to inhibit flames while maximizing the amount of emitted infrared radiation from the heated element 26. In certain embodiments, the mesh has a grid pattern, and the ideal dimensions of each grid element are: L=2.5 mm, H=1.5 mm, T=0.3 mm, and W=0.4 mm. See FIGS. 13A and 13B.

Figure 5A:
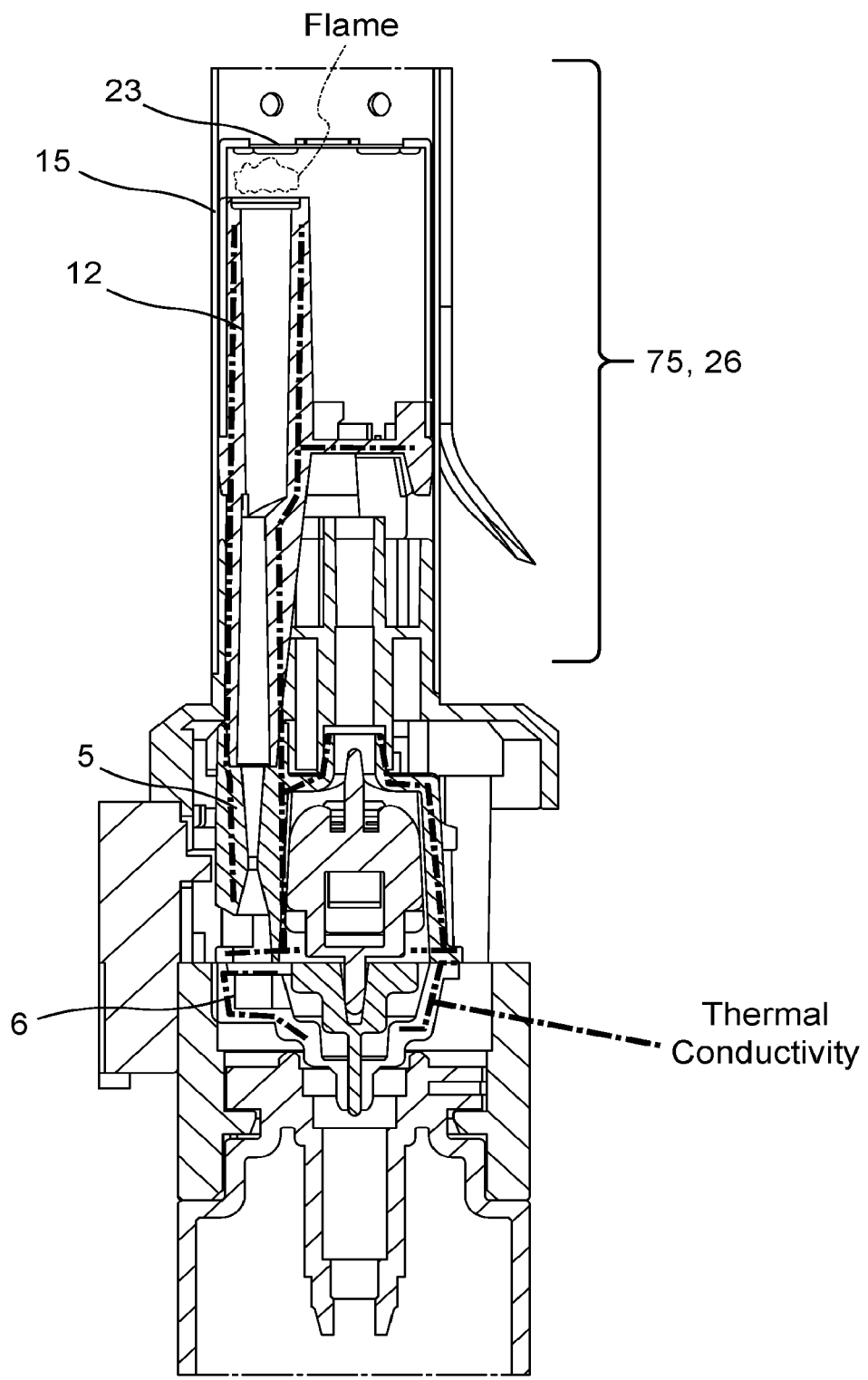
FIG. 5A illustrates thermal conductivity of the portable heating system of FIG. 2.

In certain embodiments, one or more components of the heating assembly are formed from a conductive material to continually transfer heat from the ignited gas to the lower regulator 6 for vaporization. Preferably, the lower regulator 6, upper regulator 5, and heat arrestor 12 are formed from a thermally conductive material capable of transferring heat from the ignited gas. FIG. 5A illustrates the thermal conductive path of heat through the conductive lower regulator 6, upper regulator 5, and the heat arrester 12 of the heating assembly. Initially, the heating assembly components are generally at temperature above 38° F., which is sufficient to initiate vaporization of liquid fuel (e.g. 80% butane, 20% propane) introduced into the lower regulator 6. The initially vaporized fuel passes through the heating assembly to the burner 15, where the vaporized fuel is ignited. The heat generated by the ignited gas is transferred to the heated element 26 as well as to the heat arrestor 12, upper regulator 5, and lower regulator 6. As gas continues to be ignited, the heat transferred from the flame to the lower regulator 6 allows the lower regulator to maintain a temperature suitable for continual vaporization of the liquid fuel released from the cartridge. The conductive nature of the heat arrestor 12, upper regulator 5, and lower regulator 6 allows the lower regulator 6 to maintain a temperature suitable to vaporize liquid fluid emitted from cartridge. Without thermal conductivity, the flow of fuel and gas through the heated assembly would eventually cause the heating assembly components to cool to a temperature that no longer supports vaporization of the fuel emitted from the cartridge.

In other embodiments, an external heater is used to maintain the temperature of the lower regulator suitable for vaporization of liquid fuel. The external heater is particularly helpful when the portable heating device is being used in environments having temperatures below 38° F. In such instances, the external heater may be used to raise the temperature of the heating assembly components such that liquid fuel initially released from the cartridge may be vaporized and sent to the burner. Once the burner is lit, the external heater may be shut-off and the heat transferred from the ignited gas may be used to maintain the operating temperature of the heating assembly components.

Figure 5B:
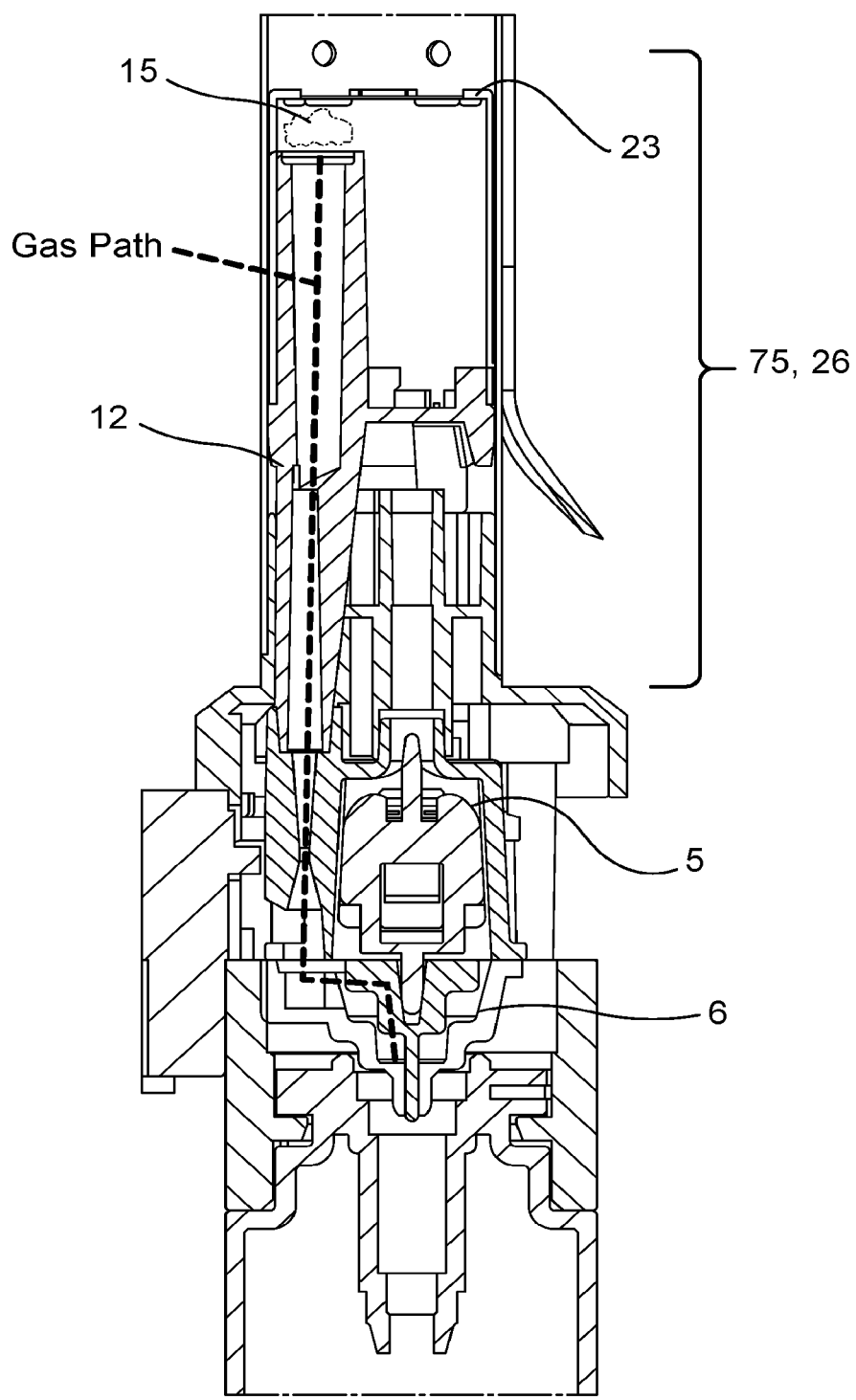
FIG. 5B illustrates the gas path of the portable heating system of FIG. 2

FIG. 5B illustrates the path of gas moving from the lower regulator 6 to the upper regulator 5, and through the heat arrestor 12.

Figure 6A:
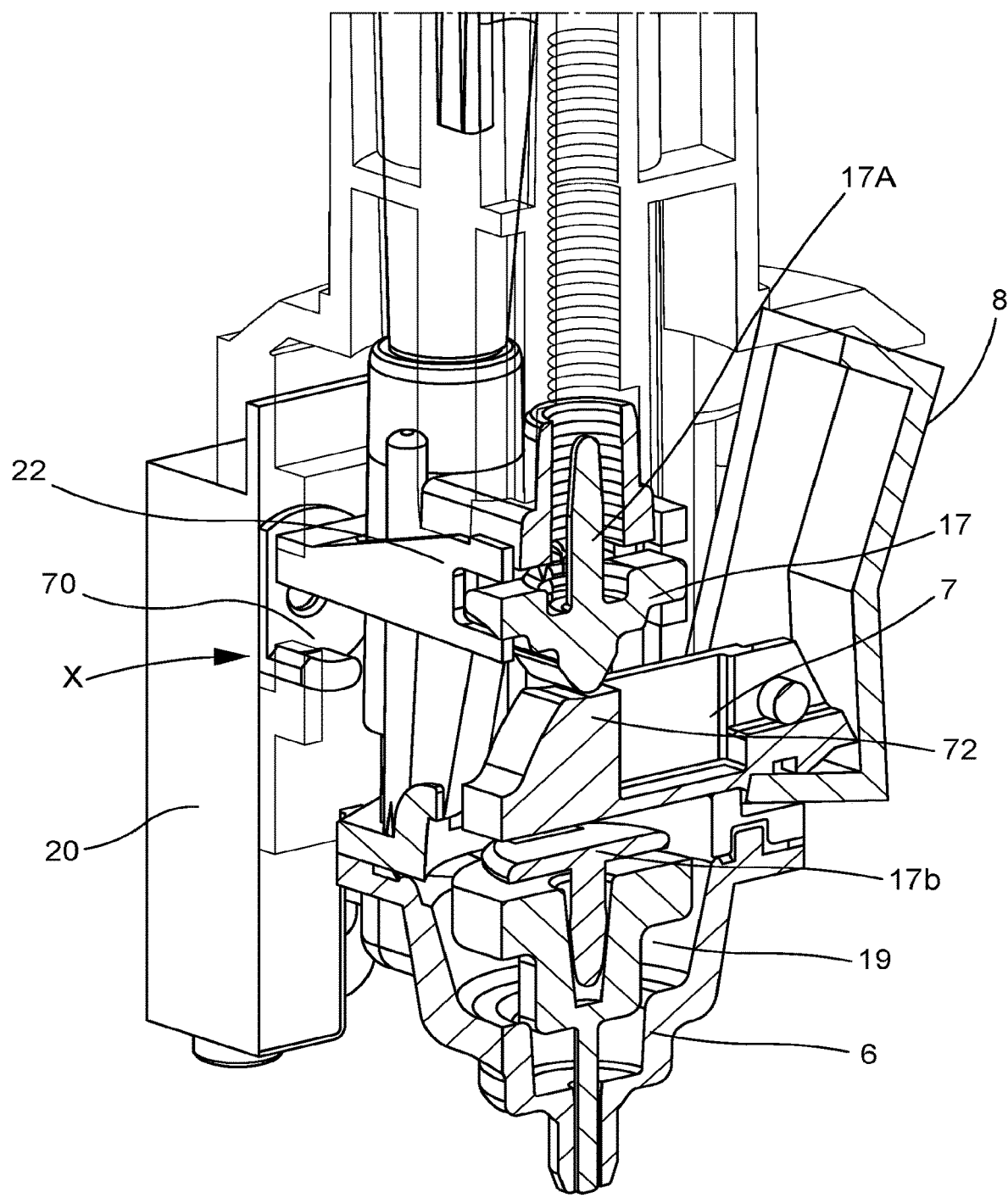
FIGS. 6A-6C illustrate various on/off configurations of the portable heating system of FIG. 2.
Figure 6B:
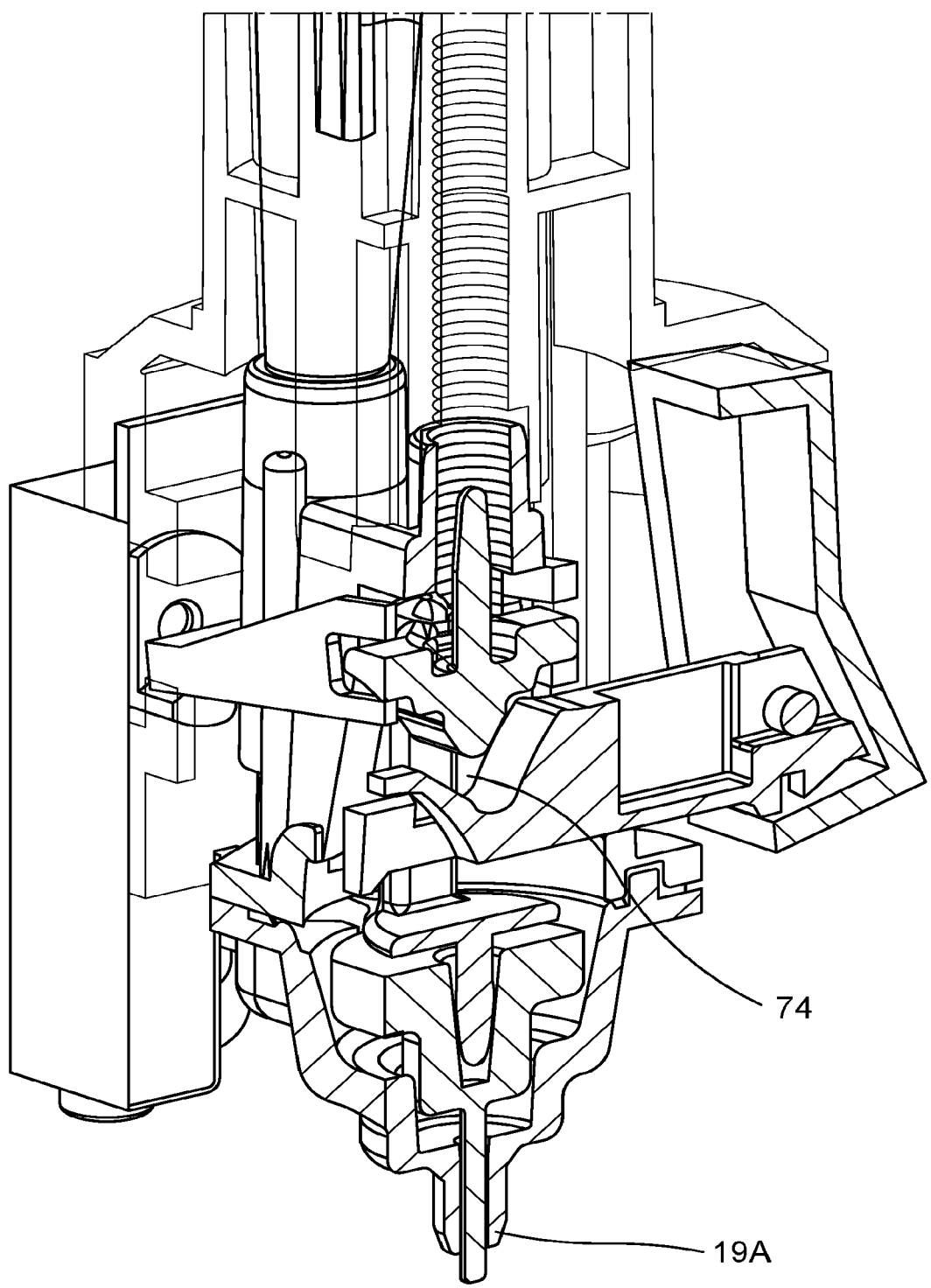
Figure 6C:
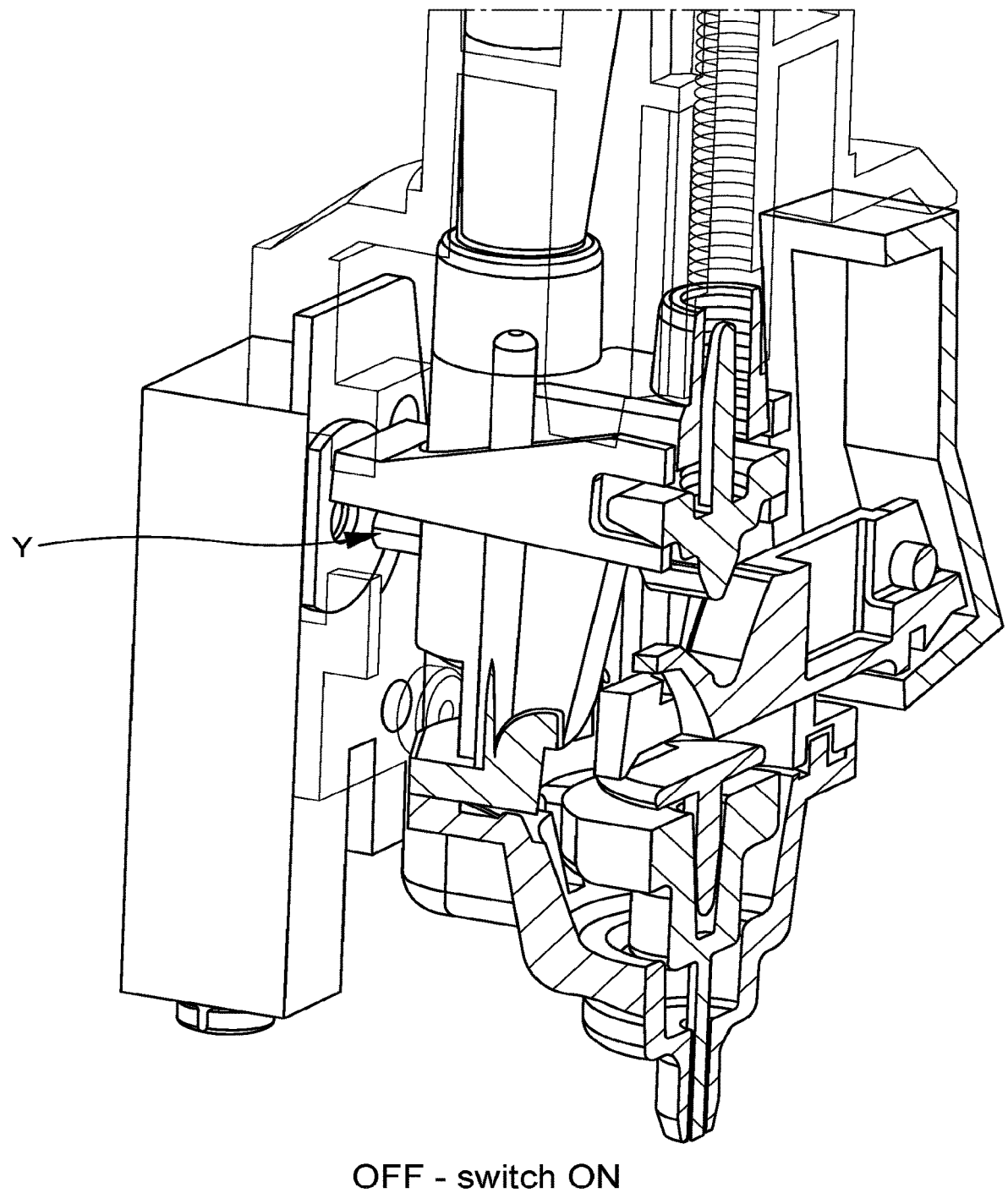

FIGS. 6A-6C illustrate the mechanisms for opening and closing the valve of the cartridge to release fuel into the lower regulator. FIG. 6A illustrates the internal components of the portable heating system when the switch 8 is in the off position. As shown in FIG. 6A, the upper plunger 17 includes distal portion 17A and a proximal portion 17B. The switch arm 7 is positioned between the distal portion 17A and the proximal portion 17B. When in the off position, the distal portion 17A of the upper plunger 17 is biased against a distal ledge 72 of the switch arm 7. The spring bias the upper plunger 17 against the switch arm. In this position, the lower plunger 19 is contained within the lower regulator 6. When the switch 8 is turned to the on-position, the switch arm 7 translates and causes the distal portion 17A of the upper plunger 17 to move proximally into an indentation 74 of the switch arm 7. The proximal movement of the upper plunger 17 translates the lower plunger 19 proximally as well, such that a stem 19A of the lower plunger 19 exits the lower regulator 6, where the stem 19A engages and releases a valve on the exit port of the cartridge. This causes the fluid to leave the cartridge and enter the lower regulator 6.

In certain embodiments, the upper plunger 17 is associated with a valve motor 20 via a plunger actuation arm 22. The plunger actuation arm 22 is attached to a rotatable cam 70 that is rotated by the valve motor 20 from a neutral positon (X of FIG. 6A) to an override position (Y of FIG. 6C). The valve motor 20 is associated with a circuit 25 (FIG. 3) that controls the valve motor 20. The circuit 25 may include a processor that executes instructions, receives commands, and sends commands. In certain embodiments, the circuit 25 sends commands to the valve motor to override the switch position by moving the upper plunger 17 (and thus the lower plunger 19) to the off position, as shown in FIG. 6C. When commanded, the valve motor rotates a cam 70 from the neutral position X to the override position 7. The rotation of cam 70 moves the plunger actuation arm 22, which in turn moves the upper plunger 17 to the off position. This effectively stops heat generation by stopping the vaporization and burning of gas through the system.

In certain embodiments, the heating assembly further comprises an outlet valve (not shown) that open and closes the outlet port 21 of the lower regulator 6. The outlet valve may be controlled by the circuit 25. The outlet valve may be engaged, for example, whenever the circuit 25 executes commands to stop the flow of fuel or gas or turn the heating assembly off. The outlet valve is another mechanism to stop the flow of fuel or gas in addition to the valve 2 of the outlet port 64 of the cartridge 4.

The circuit 25 may also be associated with one or more indicators that are used to indicate a status of the portable heating system. The indicators may include light emitting diodes (LED). In certain embodiments, the indicators may be used to indicate when the system is turned on, the system is low on gas, the system is out of gas, the system is turned off, the system is in idle mode, the system is operating a certain temperature (e.g., low, medium, high, or specific temperature ranges), the system's battery is low, etc. The indicators for notifying a user of a particular function may be the same or different. The indicators may be color-coded or have a specific emission pattern (e.g. single flash, series of flashes, or constantly emitted light).

In certain embodiments, the circuit 25 may be turned on and engaged by direct user controls (e.g. a switch 8 on the device). Alternatively, the circuit 25 may be controlled by a remote control (not shown). In such an embodiment, the circuit 210 includes a receiver that receives signal from a remote, decodes the signal, and then the circuit 210 executes the operation (e.g. on/off, temperature change) based on the signal. Remote control technology is generally known, and relies on sending a signal, such as light, Bluetooth (i.e. ultra-high frequency waves), and radiofrequency, to operate a device or circuit. Dominant remote control technologies rely on either infrared or radiofrequency transmissions. A radiofrequency remote transmits radio waves that correspond to the binary command for the button the user is pushing. As applicable to the present system, the command may include high heat, low heat, medium heat, on, or off. A radio receiver on the circuit of the portable heating system receives the signal and decodes it. The receiver then transmits the decoded signal to the circuitry, and the circuitry executes the command. The above-described concepts for radiofrequency remote controls are applicable for light and Bluetooth remote controls.

In certain embodiments, the circuit 25 of the heating assembly may also include one or more sensors that are operably associated with the processor of the circuit 25. The sensors may include a temperature sensing element and a motion sensing element. For example, the temperature sensing element may monitor the temperature emitted from the portable heating system 20. When the temperature surpasses a defined threshold, the circuit 25 will send a control to the valve motor 20 to override the switch 8. In another example, a motion sensing element may monitor the motion of the portable heating system. The motion sensing element is preferably an accelerometer. When the portable heating system stops movement for a period of time, the circuit 25 may send a control to the valve motor to override the switch. The override function effectively stops heat generation when the device is not actively being used. The above-described override features of the portable heating system allow one to effectively increase the usage of a gas cartridge by stopping the unnecessary and wasteful flow of gas from cartridge. According to certain embodiments, the override function may be reset by flipping the switch 8 to the off-position.

FIG. 14 provides an exemplary flow chart of a motion sensing process executed by the circuit 25 of the portable heating system. The circuit 25 includes a processor and a motion sensor. The processor of the circuit is in communication with the motion sensor and executes the following process 200. At step 202, the portable heating assembly is turned on. The portable heating assembly may be turned on in response to a user command, either directly or remotely (e.g. remote control). The circuit 25 receives the command to turn on, and initiates gas release, flame ignition, and the motion sensor (Step 204). During step 204, the heating assembly is engaged to release liquid fuel. The released liquid fuel is then vaporized and the vaporized fuel is ignited. For ignition, the circuit 25 directs the burner to spark, which in turn ignites the gas. The spark of the burner may be generated by batteries as directed by the circuit, or the spark may be initiated mechanically. After ignition, the circuit 25 transitions in to operation mode 206, in which the gas flow and the flame are maintained. Prior to or during operation mode 206, the circuit may generally check the temperature of the portable heating system. If the temperature is within an operable range (e.g. 200-400° F.), the circuit may direct an indicator (discussed above) to emit, for an example, a green light. During operation mode 206, the circuit continually or periodically checks its motion sensor for movement of the portable heating system (step 208). The period checks may occur every 10 s, 20 s, 30 s, 40 s, 50 s, 1 m, 2 m, etc. Preferably, the circuit keeps a record of the timing of each motion reading. The circuit utilizes the motion readings to maintain the operating mode of the system when being used or to automatically shut off the system when not being used. According to certain embodiments, the circuit relies of set time periods to assess use or non-use of the system. For example, if motion is detected during a first period of time, the circuit maintains gas flow (i.e. maintain liquid fuel release and vaporization) and flame generation (process returns to step 206). If motion is not detected after expiration of a first period of time, then the circuit may command the system to engage idle mode 210 or to power off 214. The first period of time may range anywhere between 1, 2, 3, 4, 5, 6, 7, 8, 9, 10, 11, 12, 15, 20 minutes, etc. In certain embodiments, the first period of time ranges from about 2 to about 10 minutes. In certain embodiments, the first period of time is about 5 minutes. In idle mode 210, the circuit may re-activate the fuel release and flame generation without a user command. In power off mode 214, the system may only be re-activated in response to a direct user command. During idle mode 210, the gas and the flame are shut-off. Once in idle mode 210, the circuit again continually or periodically checks its motion sensor for movement of the portable heating system (step 212), and records the timing of each motion reading. If motion is detected during a period of time after idle mode, the circuit re-activates the gas release and burner, and continues operation at step 206. If motion is not detected during a period of time after idle mode, the circuit commands the system to power off (step 214). The second period of time during idle mode may range anywhere between 1, 2, 3, 4, 5, 6, 7, 8, 9, 10, 11, 12, 15, 20 minutes, etc. In certain embodiments, the second period of time ranges from about 2 to about 10 minutes. In certain embodiments, the second period of time is about 5 minutes. After the circuit commands the system to power off, a second user command may be required to re-activate the heating assembly. The second user command may include turning the portable heating system off then on.

Figure 15:
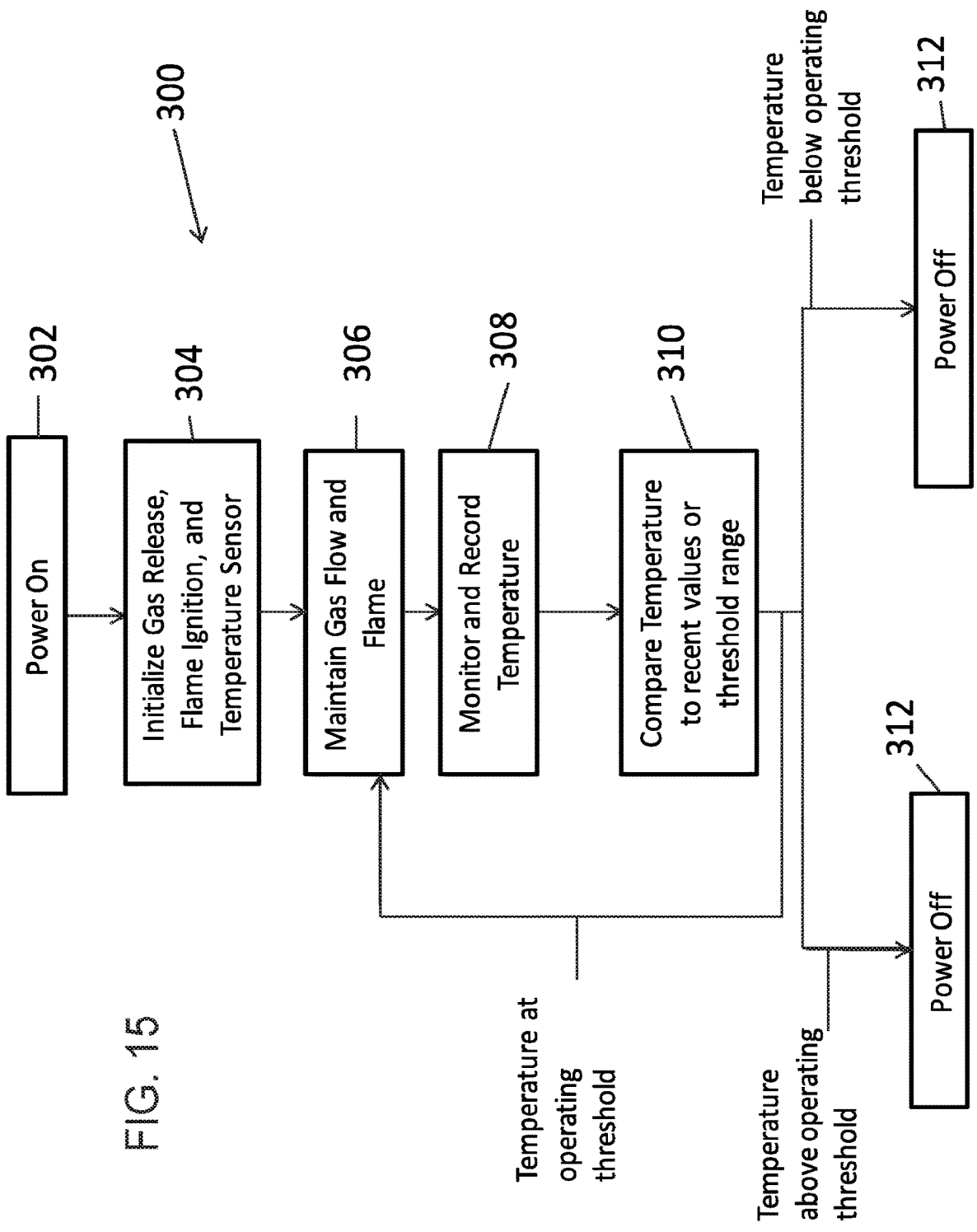
FIG. 15 provides an exemplary flow chart of a temperature sensing process executed by the circuit of the portable heating system.

FIG. 15 provides an exemplary flow chart of a temperature sensing process executed by the circuit 25 of the portable heating system. The circuit 25 includes a processor and a temperature sensor. The processor of the circuit is in communication with the temperature sensor and executes the following process 300. At step 302, the portable heating assembly is turned on. The portable heating assembly may be turned on in response to a user command, either directly or remotely (e.g. remote control). The circuit 25 receives the command to turn on, and initiates gas release, flame ignition, and the temperature sensor (Step 304). The system may then enter operation mode 306, in which gas flow and the flame are maintained. Prior to entering operation mode 304, the circuit may monitor the temperature sensor and only enter operation mode 304 if the temperature increase above an operational threshold. If temperature does not rise or meet the operational threshold, the circuit may repeat step 304 or power off 312. If the temperature is within an operable range (e.g. 200-400° F.), the circuit may direct an indicator (discussed above) to emit, for an example, a green light. During operation mode 206, the circuit continually or periodically checks its temperature sensor for the temperature of the portable heating system (step 308). The period checks may occur every 10 s, 20 s, 30 s, 40 s, 50 s, 1 m, 2 m, etc. Preferably, the circuit keeps a record of the timing of each temperature reading. A temperature reading is then compared to prior temperature readings or to threshold values (step 310). If a temperature reading is the same as a prior temperature reading or within a threshold range, then the circuit maintains operational mode 306. If the reading is different from a prior temperature reading or outside a threshold range, then the circuit powers the system off 312.

For example, if the temperature readings are a pre-defined amount lower than prior temperature readings (e.g. x amount degrees lower), the circuit may read such difference to indicate that gas flow, the flame, or both are not being properly maintained and shuts the system down. In another example, if the temperature readings are lower than a predefined threshold temperature (e.g. 150° F.), the circuit may determine that gas flow, the flame, or both are not being properly maintained and shuts the system down. If the temperature readings are a pre-defined amount higher than prior temperature readings (e.g. x amount degree higher, then the circuit may reach such difference to indicate the system is overheating and power off. In yet another example, if the temperature readings are higher than a pre-defined threshold temperature (e.g. 400° F.), the circuit may determine that the system is overheating and power off.

Figure 16:
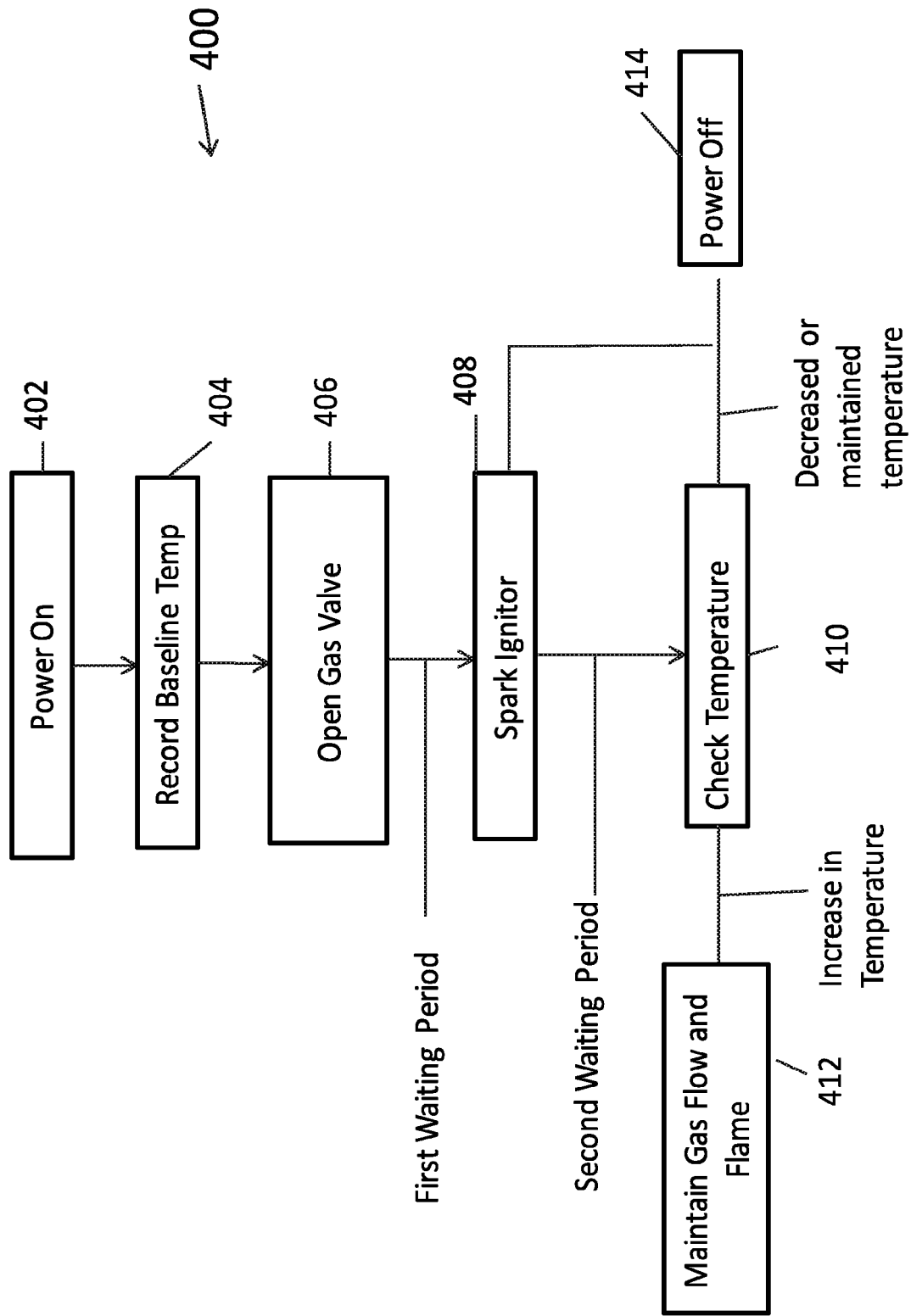
FIG. 16 provides an exemplary flow chart of an ignition process executed by the circuit of the portable heating system.

FIG. 16 provides an exemplary flow chart of an ignition process executed by the circuit 25 of the portable heating system. The circuit 25 includes a processor and a temperature sensor. The processor of the circuit is in communication with the temperature sensor and executes the following process 400. At step 402, the portable heating assembly is turned on. The portable heating assembly may be turned on in response to a user command, either directly or remotely (e.g. remote control). Once turned on, the circuit records a baseline temperature of the portable heating system (Step 404). After the temperature is recorded, the circuit instructs the heating assembly to release the gas from the cartridge (406). The circuit then waits a predefined amount of time, which accounts for the time it takes for liquid fuel to be released into the lower regulator, vaporized, and then transferred through the heat arrestor to the burner. In certain embodiments, the first waiting period is anywhere between 1 and 10 seconds, preferably 2 seconds. After the first waiting period, the circuit instructs the heating assembly to spark the ignitor (step 408). As discussed, the ignitor may be sparked by a battery or mechanically (e.g. flint). The circuit then waits a predefined amount of time to account for the time would take ignited gas to generate a temperature change. In certain embodiments, the second waiting period is anywhere between 1 and 10 seconds, preferably 5 seconds. After the second waiting period, the circuit monitors the temperature of the system (step 410). If there is an increase in temperature above the baseline temperature, then the circuit determines the gas was ignited and directs the system to enter operational mode (step 412), in which the gas flow and flame are maintained. The increase in temperature may be, for example, any reading above the baseline or any temperature reading that is a predefined amount above the baseline. If there is no temperature increase or a decrease in temperature below the baseline, then the circuit determines the gas was not ignited. The circuit may then generate another spark again in an attempt to ignite the gas again (step 408) or the circuit power off the system (step 414). The decrease in temperature may be, for example, any reading below the baseline or any temperature reading that is a predefined amount below the baseline.

As discussed above, portable heating systems of the invention may include an adaptor that directly couples to the cartridge. The adaptor is an intermediary component that couples to the cartridge and allows the cartridge to operably couple to the heating assembly, heated member, or both. With use of adaptors, the heating assembly and the cartridge operably couple without having to be directly compatible with each other. The following describes specific cartridges, adaptors, and couplings between those adaptors and cartridges in reference FIGS. 7-10B.

Figure 7:
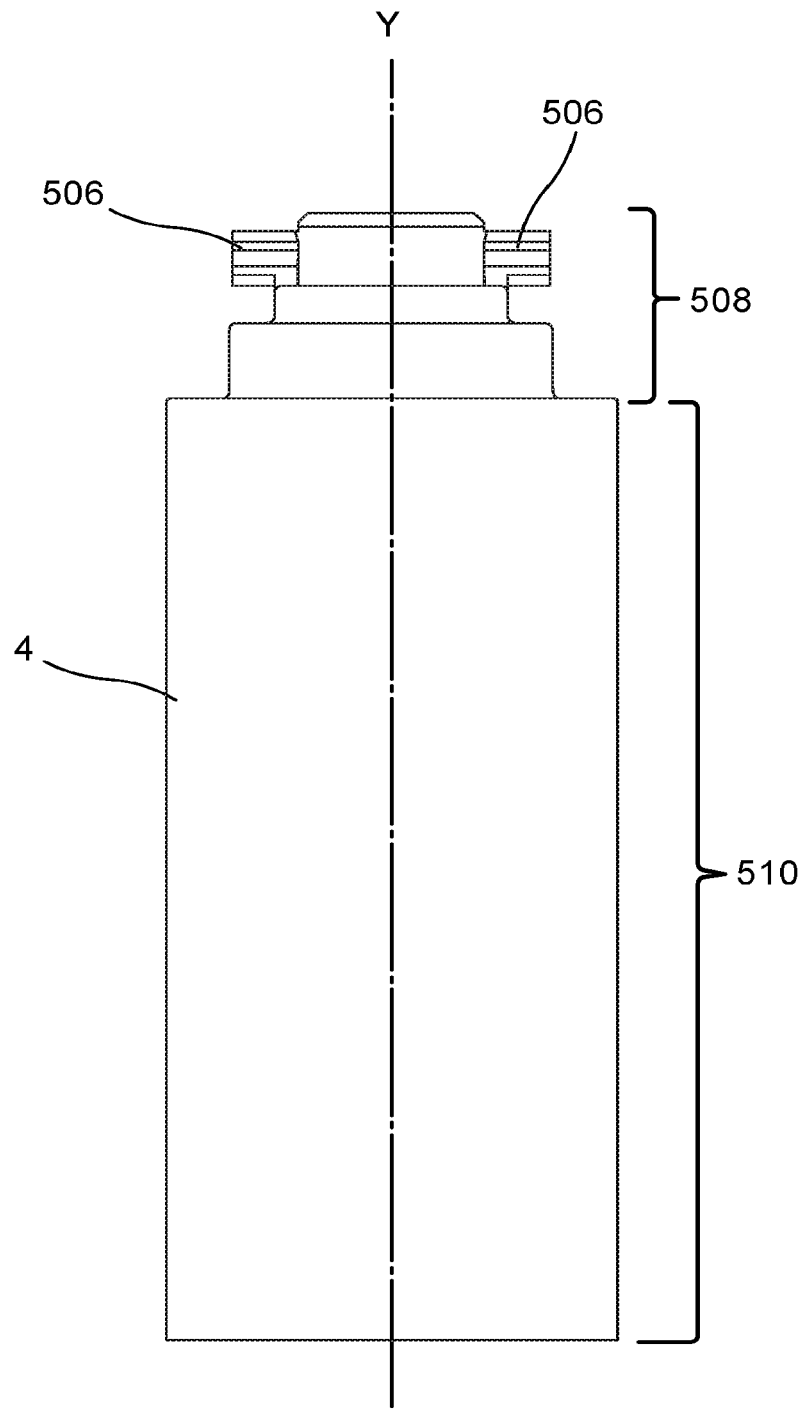
FIG. 7 illustrates a cartridge for use with portable heating systems.

FIG. 7 illustrates a cartridge 4 according to certain embodiments. As shown in FIG. 7, the cartridge has a main body portion 510 and a distal connector portion 508. The distal connector portion 508 is configured to couple to an adaptor 3. Preferably and as shown, the distal connector portion 508 is sized to be inserted within a cavity of the adaptor 3. The distal connector portion 508 includes one or more posts or bayonets 506 that extend perpendicularly from a longitudinal axis y of the cartridge 6. In certain embodiments, the cartridge 4 includes two posts 506 that oppose each other.

Figure 8A:
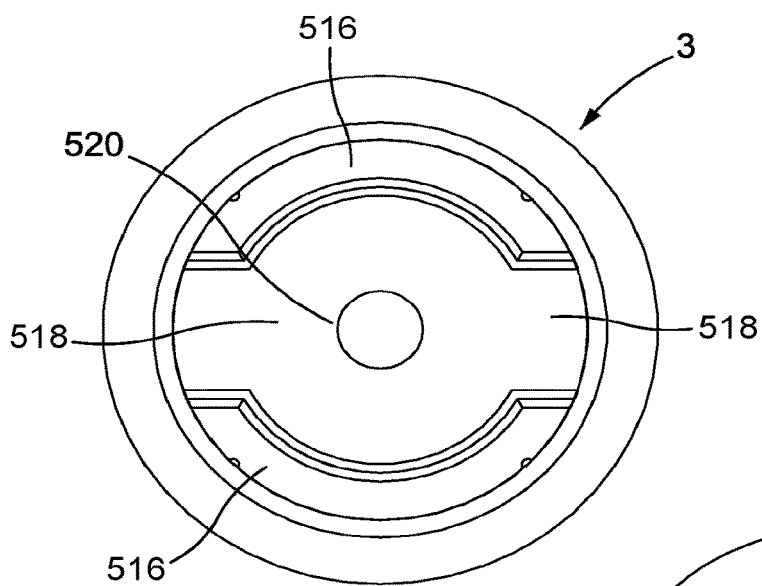
FIGS. 8A-8C illustrates various views of an adaptor for use with portable heating systems.
Figure 8B:
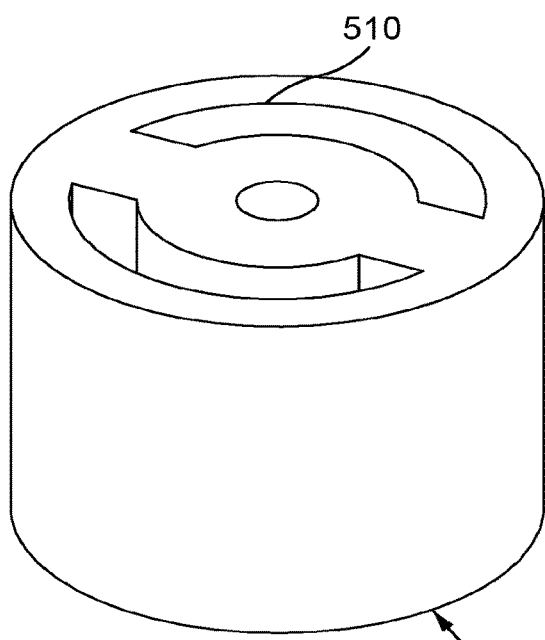
Figure 8C:
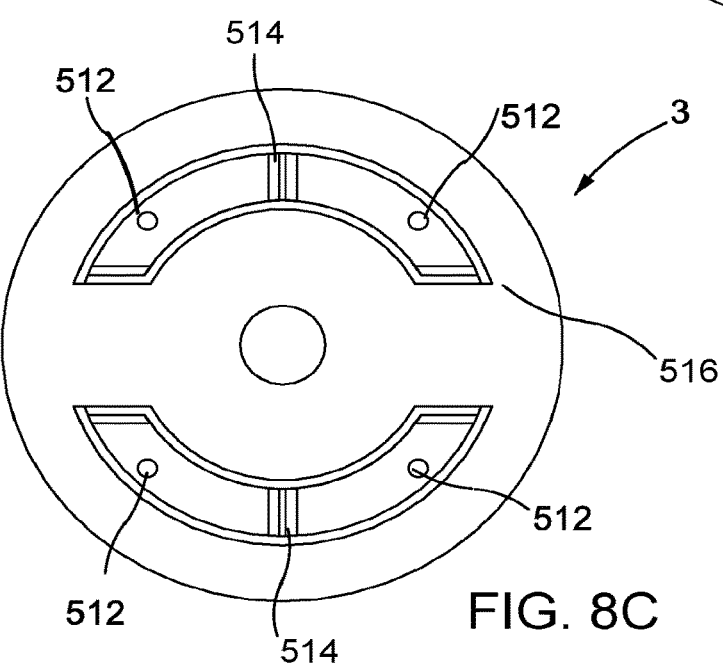

FIGS. 8A-8C illustrates an adaptor 3, according to certain embodiments. The adaptor 3 of FIGS. 8A-8C is configured to mate with the distal connector portion 508 of the cartridge 4 of FIG. 7. FIG. 8A is a bottom view of the adaptor 3. FIG. 8B is a prospective view of the adaptor 3. FIG. 8C is a top view of the adaptor 3. As shown in FIG. 8A, the adaptor 3 defines a cavity 520 with one or more inlets 518. The inlets 518 receive the posts 506 of the cartridge 4 when the distal connector portion 508 is inserted into the adaptor. The adaptor 3 also includes one or more ledges 516. The top side of the ledges 516 includes one or more detents 512, and optionally a stopper wall 514.

Figure 9:
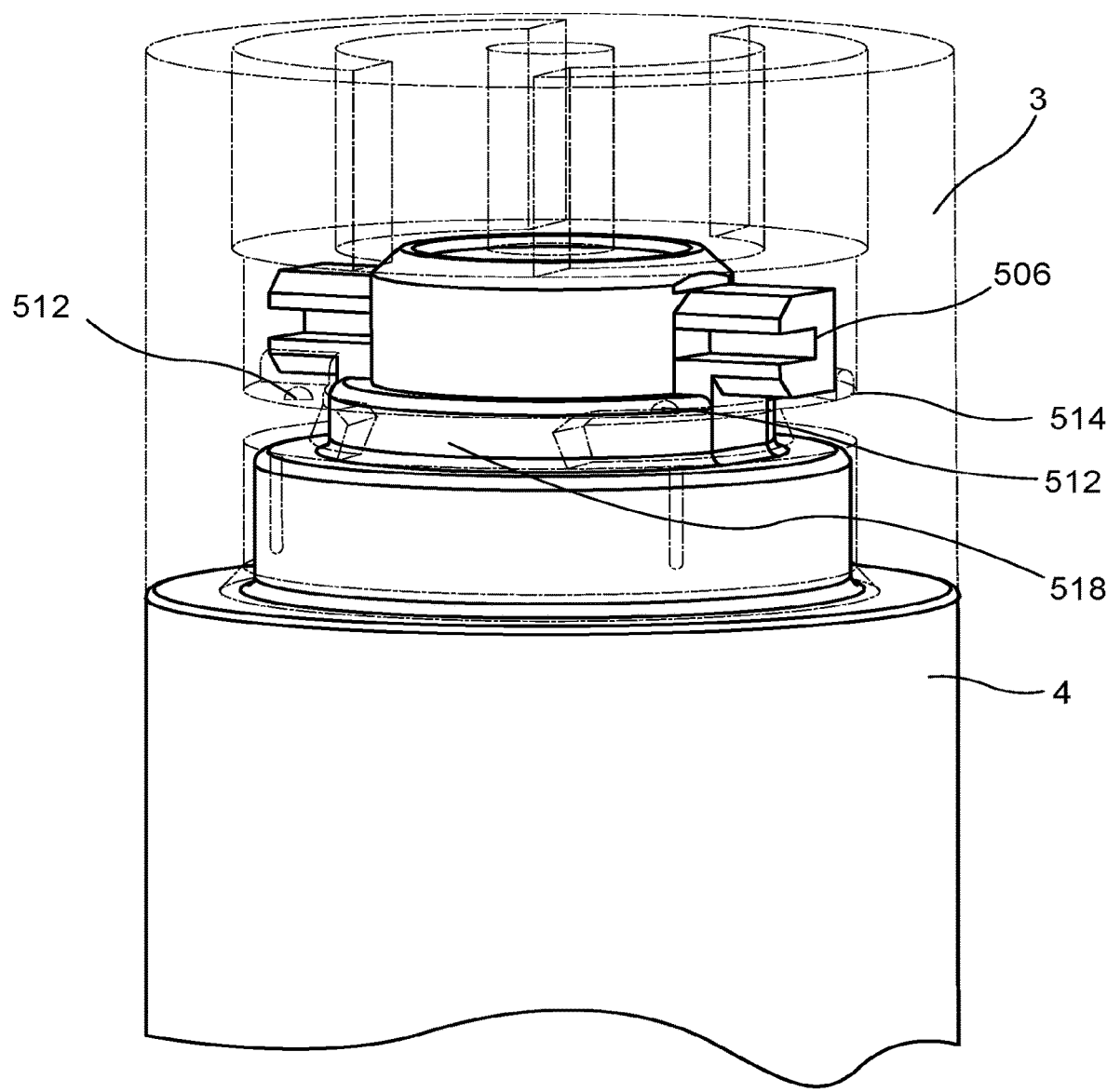
FIG. 9 illustrates the coupling between the cartridge of FIG. 7 and the adaptor of FIGS. 8A-8C.

To couple the cartridge 4 of FIG. 7 to the adaptor of FIGS. 8A-8C, a user aligns the posts 506 of the cartridge 4 with the inlets 518 of the adaptor 3, and then inserts the distal connector portion 508 of the cartridge 4 into the cavity 520 of the adaptor 3. Once the distal connector portion 508 is inserted, the cartridge 4 is rotated, which moves the posts 506 along the top side of the ledges 516. The cartridge 4 is rotated until the posts 506 pass the detents 512, which effectively locks the cartridge in place (as shown in FIG. 9). The detents 512 prevent the cartridge from undesirable rotation and maintain the positioning of the posts 508 on the ledge until intentional rotational force is applied. Once the posts 506 are positioned on the ledge 516, the cartridge 4 cannot be easily removed from the adaptor 4 because the ledges 516 prevent proximal movement of the cartridge 4. In certain embodiments, a stopper wall 514 further acts to prevent over rotation of the cartridge 4 within the adaptor 3. In order to remove the cartridge, a user has to rotate the cartridge to move the posts past the detents 512 and align the posts 506 with the inlets 518, at which position the cartridge 4 can be removed from the adaptor 3.

Figure 10A:
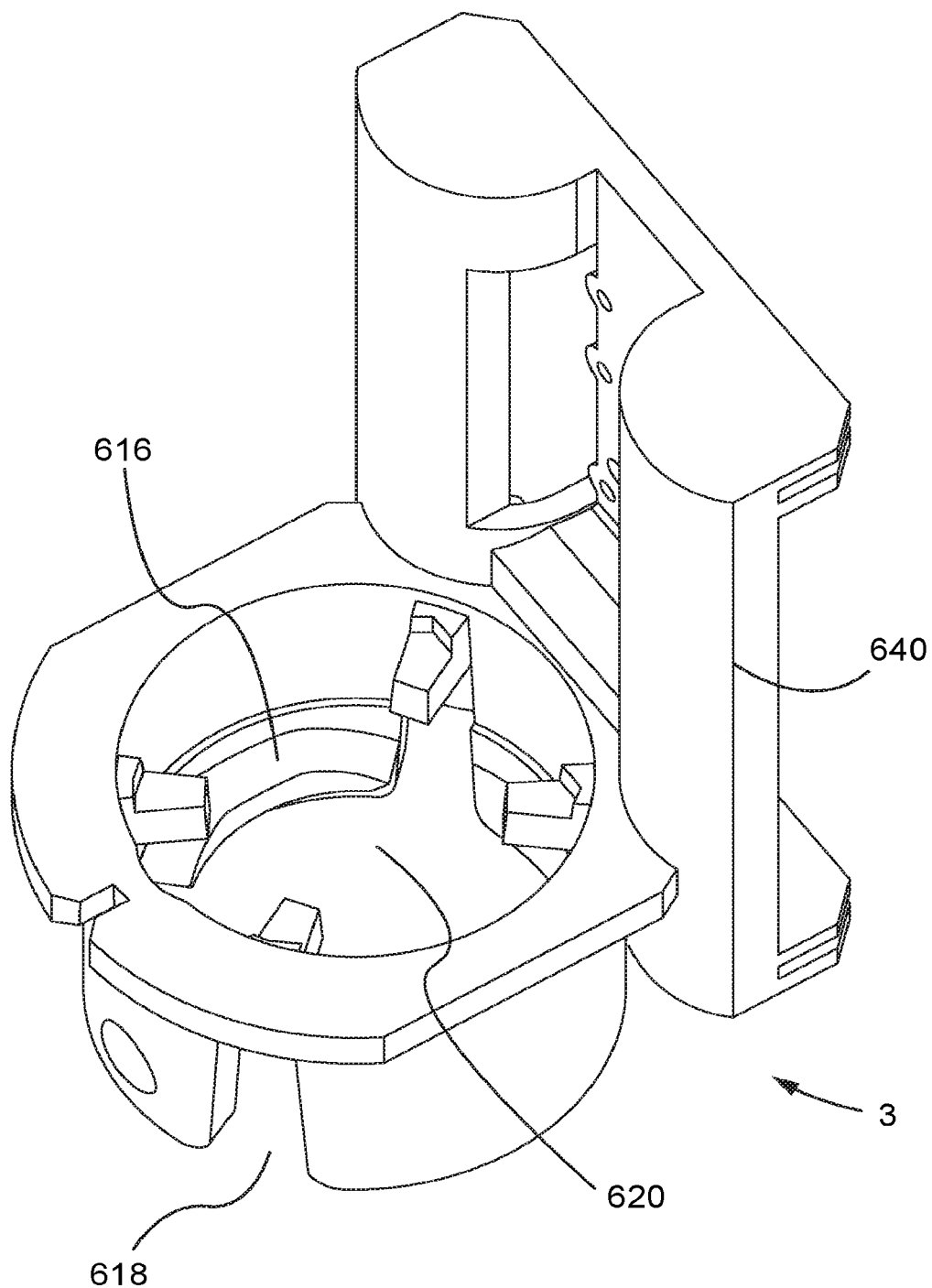
FIGS. 10A-10B illustrates another adaptor for use with portable heating systems.
Figure 10B:
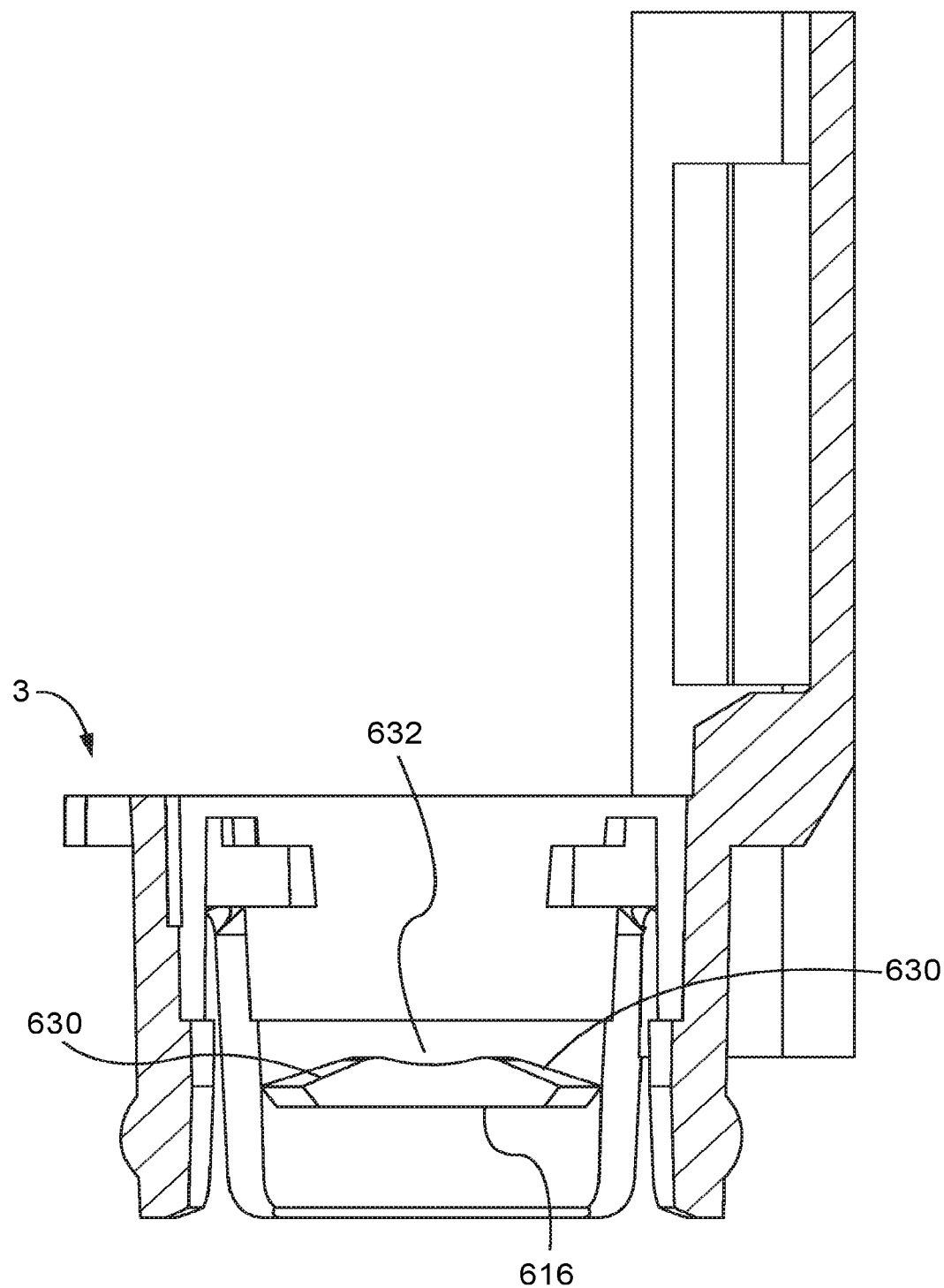

FIGS. 10A-10B illustrate another adaptor 3, according to certain embodiments. The adaptor 3 of FIGS. 10A and 10B is configured to mate with the distal connector portion 508 of the cartridge of FIG. 7. FIG. 10A is a prospective view of the adaptor 3, and FIG. 10B is a cross-sectional view of the adaptor. The adaptor 3 of FIGS. 10A-10B defines a cavity 620 and includes one or more inlets 618. The inlets 618 receive the posts 506 of the cartridge 4 when the distal connector portion 508 is inserted into the adaptor 3. The adaptor 3 also includes one or more ledges 616. A top side of the ledges 616 includes one or more ramps 630 and one or more indents 632. Preferably and as shown, each ledge includes a first ramp 630 and a second ramp 630 that lead to an indent 632.

To couple the cartridge 4 of FIG. 7 to the adaptor of FIGS. 10A-10B, a user aligns the posts 506 of the cartridge 4 with the inlets 618 of the adaptor 3, and then inserts the distal connector portion 508 of the cartridge 4 into the cavity 620 of the adaptor 3. Once the distal connector portion 508 is inserted, the cartridge 4 is rotated, which moves the posts 506 up a ramp 630 of the ledge. The cartridge 4 is rotated until the posts 506 pass the ramp 630 and enter into the indent 632, which effectively locks the cartridge 4 in place. The indent 512 prevents the cartridge 4 from undesirable rotation and maintains the positioning of the posts 508 on the ledge 616 until intentional rotational force is applied. In order to remove the cartridge, a user has to rotate the cartridge out of the indent 632 and align the posts 506 with the inlets 618, at which position the cartridge 4 can be removed from the adaptor 3.

The invention may be embodied in other specific forms without departing from the spirit or essential characteristics thereof. The foregoing embodiments are therefore to be considered in all respects illustrative rather than limiting on the invention.

What is claimed is:

1. A portable heating system, comprising:
a heating assembly comprising a regulator comprising a conductive material and defining a fuel cavity, the regulator, when at a temperature above about 38° F., is configured to vaporize a liquid fuel mixture of propane and butane received within the fuel cavity and emit only vaporized fuel from the regulator; and
a circuit operably coupled to the heating assembly and configured to at least regulate a flow of the liquid fuel mixture to the fuel cavity of the regulator to thereby control output of heat from the portable heating system in response to one or more remotely-received user commands, the circuit comprising:
a receiver configured to:
receive one or more wireless signals from a remote device associated with one or more user commands for controlling the portable heating system; and
decode the one or more wireless signals; and
a processor operable to execute the one or more commands associated with the one or more decoded wireless signals, wherein the processor is operable to:
activate the heating assembly to release the liquid fuel mixture in response to a first remotely-received user command; and
de-activate the heating assembly to stop release of the liquid fuel mixture in response to a second remotely-received user command.

2. The system of claim 1, wherein the liquid fuel mixture comprises at least 70% butane.

3. The system of claim 1, wherein the liquid fuel mixture comprises about 80% butane and about 20% propane.

4. The system of claim 1, wherein pressure of the fuel cavity is about 25 psi or less.

5. The system of claim 1, wherein the regulator comprises an inlet port that interfaces with a fuel cartridge, the fuel cartridge stores the liquid fuel mixture of propane and butane.

6. The system of claim 5, wherein the liquid fuel mixture from the fuel cartridge is introduced into the regulator through the inlet port at about 3.4 grams per hour.

7. The system of claim 1, wherein the fuel cavity has a volume of at least 300 mm$^3$.

8. The system of claim 1, wherein the regulator comprises an outlet port through which vaporized gas is transferred to a burner for ignition.

9. The system of claim 8, further comprising a heated element configured to be heated by the ignited gas.

10. The system of claim 9, wherein the heated element, the regulator, and a fuel cartridge are operably coupled.

11. The system of claim 10, wherein the fuel cartridge forms, at least in part, a handle of the portable heating system.

12. The system of claim 9, wherein the heated element is a hair curling iron or a hair straightener.

13. The system of claim 9, wherein the heated element comprises a plurality of openings that emit infrared radiation from the ignited gas.

14. A portable heating system, comprising:
a heating assembly comprising:
a regulator having a first temperature and comprising an inlet port, an outlet port, and an inner surface that defines a fuel cavity; and
a diaphragm forming a side of the fuel cavity and configured to pressurize the fuel cavity;
wherein exposure of a liquid mixture of propane and butane received within the pressurized fuel cavity through the inlet port to the first temperature and the inner surface of the regulator vaporizes the liquid mixture and provides that only vaporized fuel is emitted from the outlet port of the regulator; and
a circuit operably coupled to the heating assembly and configured to at least regulate a flow of the liquid fuel mixture to the fuel cavity of the regulator to thereby control output of heat from the portable heating system in response to one or more remotely-received user commands, the circuit comprising:
a receiver configured to:
receive one or more wireless signals from a remote device associated with one or more user commands for controlling the portable heating system; and
decode the one or more wireless signals; and
a processor operable to execute the one or more commands associated with the one or more decoded wireless signals, wherein the processor is operable to:
activate the heating assembly to release the liquid fuel mixture in response to a first remotely-received user command; and
de-activate the heating assembly to stop release of the liquid fuel mixture in response to a second remotely-received user command.

15. The system of claim 14, wherein a fuel cartridge interfaces with the regulator at the inlet port.

16. The system of claim 15, further comprising;
a burner; and
a fuel shaft associated with the outlet port, the fuel shaft configured to direct the vaporized gas to the burner for ignition.

17. The system of claim 16, further comprising a heated element configured to be heated by the ignited gas.

18. The system of claim 17, wherein the heated element, fuel cartridge, and regulator are operably coupled.

19. The system of claim 15, wherein the fuel cartridge forms, at least in part, a handle for the portable heating system.

20. A portable heating system, comprising:
a heating assembly comprising a regulator defining a fuel cavity, comprising an inlet port to the fuel cavity, and being formed from a conductive material, the regulator configured to immediately vaporize a liquid mixture of propane and butane received through the inlet port and into the fuel cavity without use of a vaporizer that is separate from the regulator; and
a circuit operably coupled to the heating assembly and configured to at least regulate a flow of the liquid fuel mixture to the fuel cavity of the regulator to thereby control output of heat from the portable heating system in response to one or more remotely-received user commands, the circuit comprising:
a receiver configured to:

receive one or more wireless signals from a remote device associated with one or more user commands for controlling the portable heating system; and decode the one or more wireless signals; and a processor operable to execute the one or more commands associated with the one or more decoded wireless signals, wherein the processor is operable to:

activate the heating assembly to release the liquid fuel mixture in response to a first remotely-received user command; and de-activate the heating assembly to stop release of the liquid fuel mixture in response to a second remotely-received user command.

\* \* \* \* \*